US011506118B2

(12) United States Patent
Goleczka et al.

(10) Patent No.: US 11,506,118 B2
(45) Date of Patent: Nov. 22, 2022

(54) MODULAR GENSET ENCLOSURE COMPONENTS

(71) Applicant: Cummins Power Generation Limited, Ramsgate (GB)

(72) Inventors: Peter A. Goleczka, Minnetonka, MN (US); Gordon A. Read, Ramsgate (GB)

(73) Assignee: Cummins Power Generation Limited, Ramsgate (GB)

( * ) Notice: Subject to any disclaimer, the term of this patent is extended or adjusted under 35 U.S.C. 154(b) by 0 days.

(21) Appl. No.: 17/131,077

(22) Filed: Dec. 22, 2020

(65) Prior Publication Data

US 2021/0108563 A1 Apr. 15, 2021

Related U.S. Application Data

(62) Division of application No. 16/093,003, filed as application No. PCT/IB2017/052094 on Apr. 11, 2017, now Pat. No. 10,876,471.

(60) Provisional application No. 62/321,582, filed on Apr. 12, 2016.

(51) Int. Cl.

| | |
|---|---|
| ***E02B 5/00*** | (2006.01) |
| ***E02B 5/02*** | (2006.01) |
| ***B62M 27/02*** | (2006.01) |
| ***F02B 63/04*** | (2006.01) |

(52) U.S. Cl.
CPC ...... *F02B 63/044* (2013.01); *F02B 2063/045* (2013.01)

(58) Field of Classification Search
CPC .... F02B 63/044; F02B 2063/045; E02B 5/00; E02B 5/02; E02F 9/0841; B60J 7/11; B62M 27/02
USPC ......... 322/100; 172/292, 789; 180/182, 190, 180/235; 296/215, 218; 404/96, 104, 404/109, 127
See application file for complete search history.

(56) References Cited

U.S. PATENT DOCUMENTS

| | | | | | |
|---|---|---|---|---|---|
| 4,364,438 | A | * | 12/1982 | Pyle | E02F 9/0841 172/292 |
| 4,546,418 | A | | 10/1985 | Baggio et al. | |
| 4,699,543 | A | * | 10/1987 | Mio | E02B 5/02 405/268 |
| 4,977,532 | A | | 12/1990 | Borkowicz et al. | |
| 5,243,918 | A | * | 9/1993 | Bounds | E01B 29/05 104/5 |
| RE35,150 | E | * | 1/1996 | McKenna, Jr | A01D 46/243 56/328.1 |

(Continued)

OTHER PUBLICATIONS

International Search Report and Written opinion for PCT Patent Application No. PCT/IB2017/052094, dated Aug. 9, 2017, 18 pages.

(Continued)

*Primary Examiner* — Xiaoliang Chen
(74) *Attorney, Agent, or Firm* — Foley & Lardner LLP

(57) ABSTRACT

A genset module coupling assembly includes a cross-bar of a module chassis oriented orthogonal to an engine neutral axis of vibration defined by an engine mounted on an engine chassis, a first bracket coupled to the cross-bar on a first side of the engine neutral axis of vibration, and a second bracket coupled to the cross-bar on a second side of the engine neutral axis of vibration. The first bracket and the second bracket are positioned to minimize communication of vibrations from the engine chassis to the module chassis.

7 Claims, 20 Drawing Sheets

(56) References Cited

U.S. PATENT DOCUMENTS

| | | | | |
|---|---|---|---|---|
| 6,220,656 | B1 * | 4/2001 | Martin, Jr. | B60J 7/11 49/501 |
| 6,308,550 | B1 * | 10/2001 | Papesh | B21D 1/14 72/305 |
| 7,152,835 | B1 * | 12/2006 | Riblet | E04G 5/06 248/248 |
| 7,221,061 | B2 | 5/2007 | Alger et al. | |
| 7,938,760 | B1 * | 5/2011 | Webber | A63B 21/15 482/137 |
| 8,415,829 | B2 | 4/2013 | Di Cristofaro | |
| 8,427,005 | B1 | 4/2013 | Kisner et al. | |
| 8,462,518 | B2 | 6/2013 | Marroquin et al. | |
| 8,495,869 | B2 | 7/2013 | Beissler et al. | |
| 8,642,900 | B2 | 2/2014 | Nordling et al. | |
| 8,816,518 | B2 | 8/2014 | Campion et al. | |
| 2002/0033290 | A1 * | 3/2002 | Vaisanen | B62M 27/02 180/190 |
| 2004/0104577 | A1 | 6/2004 | Alger et al. | |
| 2004/0149550 | A1 | 8/2004 | Allen | |
| 2006/0119155 | A1 * | 6/2006 | Huxter | B60N 2/06 297/331 |
| 2009/0057006 | A1 | 3/2009 | Kishibata et al. | |
| 2010/0147842 | A1 | 6/2010 | Reynard et al. | |
| 2010/0308648 | A1 | 12/2010 | Krackhardt et al. | |
| 2012/0102929 | A1 | 5/2012 | Beissler et al. | |
| 2012/0298478 | A1 * | 11/2012 | Friesen | B65G 65/42 198/311 |
| 2015/0292435 | A1 | 10/2015 | Yamanaka et al. | |
| 2016/0311314 | A1 | 10/2016 | Kurokawa | |
| 2017/0009635 | A1 | 1/2017 | Mitsuda | |
| 2017/0009638 | A1 | 1/2017 | Suetou et al. | |
| 2017/0204766 | A1 | 7/2017 | Matsui et al. | |

OTHER PUBLICATIONS

OilCube W20 Containerized Power Plant brochure, issued Feb. 18, 2008, Wartsila Corporation, Helsinki Finland, 24 pages.

* cited by examiner

MODULAR GENSET ENCLOSURE COMPONENTS

CROSS-REFERENCE TO RELATED PATENT APPLICATIONS

This application is a divisional of U.S. patent application Ser. No. 16/093,003, filed on Oct. 11, 2018, which is a U.S. national stage application of P.C.T. Application No. PCT/IB2017/052094, filed on Apr. 11, 2017, which claims priority to and the benefit of U.S. Provisional Patent Application No. 62/321,582 filed on Apr. 12, 2016, all of the contents of which are incorporated herein by reference in their entirety.

TECHNICAL FIELD

The present disclosure relates generally to containers for housing engines and generator sets (gensets).

BACKGROUND

Large commercial internal combustion engines and gensets are used extensively for physical power production (such as pumps or other shaft power outputs) and power generation and are deployed at a desired deployment site to meet power requirements at the site. Gensets are often shipped to the deployment site in shipping containers or enclosures. The standard shipping containers used by the shipping industry generally follow the International Organization for Standardization (ISO) 6346 standard. Such standard ISO containers generally have a length of about 12.2 meters, a width of about 2.4 meters, and various height allowances. These containers can be stacked compactly in an array on shipping vessels, trains, or trucks to maximize space utilization and minimize shipping cost. Many conventional gensets have dimensions or have accessories operatively coupled thereto such that the dimensions of the genset exceeds the dimensions of the standard containers. To accommodate such gensets, the dimensions of the containers are generally modified, for example, yielding non-standard size containers or oversize containers. Shipping such oversize or otherwise non-standard size containers significantly increases the shipping cost as well as installation cost of the genset.

SUMMARY

Embodiments described herein relate generally to containers for housing an engine or genset, and in particular to modular genset assemblies and enclosures which can be removably coupled to a genset engine enclosure or chassis to extend the dimensions of the genset engine enclosure and/or allow removable coupling of accessories and modules thereto. In various embodiments, a modular genset assembly can include an air handling module installed on a mounting frame and mounted on a module chassis that is configured to be removably coupled to a genset engine chassis.

In some embodiments, a genset enclosure assembly includes a first enclosure defining a first internal volume. A genset engine is positioned within the first internal volume. A first opening is defined in a first sidewall of a first side of the first enclosure. The genset enclosure assembly also includes a second enclosure defining a second internal volume. The second enclosure is positioned adjacent to the first side and removably coupled to the first side of the first enclosure. A first genset module is positioned in the second internal volume and operably coupled to the genset engine through the first opening.

In some embodiments, a genset module coupling assembly for coupling a genset module to a genset engine includes a module chassis including a pair of arms. At least a portion of the pair of arms is configured to be positioned adjacent to at least a portion of a pair of struts of a genset engine chassis. The pair of arms are located in the same plane as the pair of struts. A cross-bar is positioned between the pair of arms. The cross-bar is oriented orthogonal to the pair of arms and coupled to each of the pair of arms. A pair of brackets are positioned on the cross-bar and configured to be removably coupled to mating receptacles included in the genset engine chassis so that the pair of brackets are located proximal to a neutral axis of the genset engine chassis. A first bracket of the pair of brackets is located on one side of the neutral axis. A second bracket of the pair of brackets is positioned on a second side of the neutral axis opposite the first side. The location of the brackets is configured to minimize communication of vibrations produced by a genset engine mounted on the genset engine chassis to the module chassis. In particular embodiments, the pair of brackets are pivotally mounted on the cross-bar.

In some embodiments, a modular genset includes a first enclosure defining a first internal volume, a first sidewall of a first side, and a first opening defined in the first sidewall. A genset engine chassis is coupled to the first enclosure within the first internal volume and includes a pair of struts, a first mating receptacle, and a second mating receptacle. The genset engine chassis is configured to support a genset engine within the first internal volume so that the first mating receptacle and the second mating receptacle are arranged on opposing sides of a neutral axis of vibration. A second enclosure defining a second internal volume is positioned adjacent to the first side. A genset module chassis includes a pair of arms, at least a portion of the arms configured to be positioned adjacent to at least a portion of the pair of struts, and located in the same plane as the pair of struts, a cross-bar coupled between the pair of arms, the cross-bar oriented orthogonal to the pair of arms, a first bracket positioned on the cross-bar and configured to be removably coupled to the first mating receptacle, and a second bracket positioned on the cross-bar and configured to be removably coupled to the second mating receptacle. A genset module is coupled to the genset module chassis and positioned within the second internal volume and operably coupled to the genset engine through the first opening. The location of the brackets minimizes communication of vibrations produced by the genset engine to the genset module.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
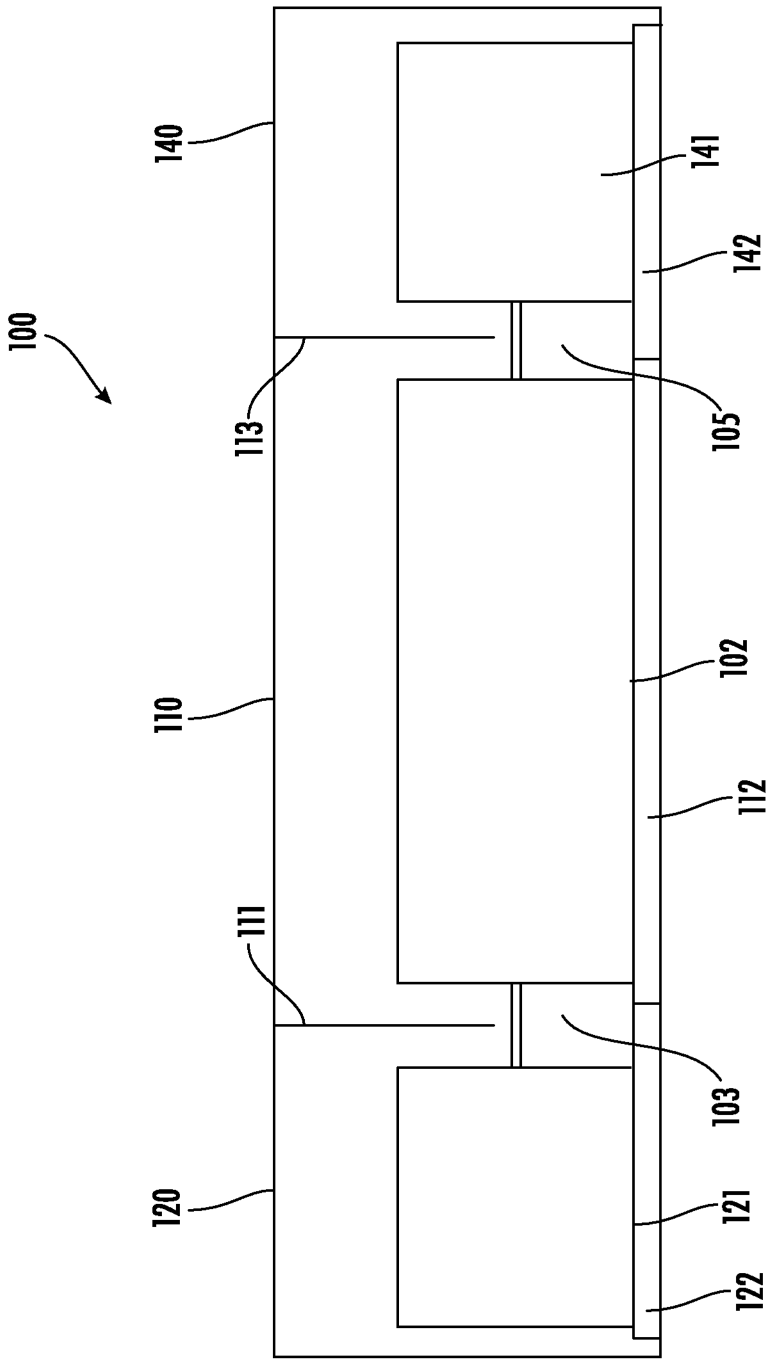
FIG. 1 is a schematic block diagram of a genset enclosure assembly.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to containers for housing an engine or genset, and in particular to modular genset assemblies and enclosures which can be removably coupled to a genset engine enclosure or chassis to extend the dimensions of the genset engine enclosure as well as allow removable coupling of accessories and modules thereto. For example, a modular genset assembly can include an air handling module installed on a mounting frame and mounted on a module chassis that is configured to be removably coupled to a genset engine chassis. Various other modules can additionally or alternatively be mounted within the modular genset assemblies.

Large commercial internal combustion engines and gensets are used extensively for physical power production (such as pumps or other shaft power outputs) and power generation and are deployed at a desired deployment site to meet power requirements at the site. Gensets are often shipped to the deployment site in shipping containers or enclosures. The standard shipping containers used by the shipping industry generally follow the International Organization for Standardization (ISO) 6346 standard. Standard ISO containers generally have a length of about 12.2 meters, a width of about 2.4 meters, and various height allowances. These containers can be stacked compactly in an array on shipping vessels, trains, or trucks to maximize space utilization and minimize shipping cost. Many conventional gensets have dimensions or have accessories operatively coupled thereto such that the dimensions of the genset exceeds the dimensions of the standard containers.

Many conventional gensets have dimensions which fall just within the width requirements of the ISO standard containers. While the internal volume of standard ISO containers is often sufficient to accommodate the genset, no room remains in the container for users (e.g., service personnel) to access the genset, particularly for larger sized high horsepower engines or high kVA output gensets. Such containers or enclosures generally include side opening panels, doors or cutouts to enable service personnel to access and perform maintenance or repair work on the genset.

Gensets can also be shipped in oversized containers which are larger (by being either taller, longer, and/or wider) than the ISO standard containers (e.g., defining a width of about 3 meters). While such non-ISO compliant containers have sufficient space within their internal volumes for users to access the genset, they require special shipping protocols (e.g., special loading requirements, vessels or other equipment) which can significantly raise the shipping cost, the total cost of ownership, and increase shipping times.

Furthermore, the ventilation, exhaust aftertreatment, or other support or auxiliary equipment associated with gensets generally occupy more space than is available in the enclosure/container and are therefore often shipped loose and/or mounted externally on the genset container. Mounting the ventilation or other auxiliary equipment within the genset container restricts space in the container. Shipping the ventilation and/or auxiliary equipment loosely requires assembly at the deployment site which further raises shipping costs and can lead to operational delays, increased warranty claims, and a need for higher skilled service personnel and time to install and commission the engine or genset.

Embodiments of modular genset enclosure assemblies and components described herein may provide several advantages including, for example: (1) providing modularized genset components that can be removably coupled to a genset engine positioned within a standard ISO container; (2) allowing shipping of genset engines in standard sized containers thereby reducing shipping weight and costs; (3) allowing on-site "plug and play" type assembly of genset modules which can be placed in separate enclosures to the genset engine positioned within a genset enclosure; (4) allowing multiple modules to be removably coupled to the genset engine; (5) enabling easier field maintenance by allowing swapping of a malfunctioning module with a replacement module in a rapid and facile manner; (6) simplifying production lines by allowing for quick system option changes and development of new application and models; and/or (7) reducing or otherwise limiting transmission of vibrations generated by a genset engine to the genset module coupled thereto.

FIG. 1 is a schematic block diagram of a genset enclosure assembly 100. The genset enclosure assembly includes a first enclosure 110, a second enclosure 120 and a third enclosure 140.

The first enclosure 110 defines a first internal volume. A genset engine 102 is positioned within the first internal volume. In some embodiments, the first enclosure 110 includes a shipping container, for example, an ISO 6346 standard container. The genset engine 102 may include a diesel engine, a gasoline engine, a dual-fuel engine, or any other engine. In various embodiments, the genset engine 102 can be mounted on a genset engine chassis 112 positioned on a base or floor of the first enclosure 110. The first enclosure 110 can include doors, windows or movable panels (e.g., slidable or hinged panels) to allow access to the genset 102 positioned within the first internal volume. The first enclosure 110 is sized and shaped to house the genset engine 102. In particular embodiments, the genset engine 102 can have dimensions such that only the genset engine 102 can be accommodated within the first internal volume. In other embodiments, the genset engine 102 can have dimensions such that one or more genset modules can also be housed within the first enclosure 110 (e.g., one or more genset modules).

A first side 111 of the first enclosure 110 includes a first sidewall. A first opening 103 is defined in the first sidewall of the first enclosure 110. The first opening 103 can be configured to receive components of any module as described herein positioned proximal to (e.g., adjacent to) the first side 111 of the first enclosure 110 to allow operative coupling of the module with the genset engine 102 through the first opening 103. As described herein, the term "adjacent" should be understood as encompassing touching (e.g., the module touching or abutting the first side 111), positioned at a pre-determined distance but not touching (e.g., the module positioned next to the first side 111 but separated by a pre-determined distance), or inserted into (e.g., the module inserted into the first enclosure 110 through the first side). While shown as including a single first opening 103, a plurality of openings can be defined on the first sidewall and configured to receive various components of the module positioned adjacent to the first side 111 and coupled thereto.

A second side 113 of the first enclosure 110 opposite the first side 111 includes a second sidewall. A second opening 105 is defined in the second sidewall and is configured to receive components of any module as described herein positioned proximal to (e.g., adjacent to) the second side 113 of the first enclosure 110 to allow operative coupling of the module with the genset engine 102 through the second opening 105. While shown as including a single second opening 105, a plurality of openings can be defined on the second sidewall and configured to receive various components of the module positioned adjacent to the second side 113 and coupled thereto.

One or more openings can also be defined on the other sidewalls orthogonal to the first sidewall and the second sidewall, the roof and/or floor of the first enclosure 110 to allow coupling of the genset engine 102 with various modules positioned adjacent to any side of the first enclosure 111 through the one or more openings.

The second enclosure 120 defines a second internal volume and is positioned adjacent to the first side 111 and removably coupled to the first side 111 of the first enclosure 110. For example, the second enclosure 120 can be touching the first side 111 (e.g., abut the first side 111), positioned within a predetermined distance of the first side 111 but not touching the first side 111, or a portion of the second enclosure 120 inserted into first side 111 of the first enclosure 110. The second enclosure 120 can be coupled to the first side 111 using nuts, screws, bolts, locking pins, a snap-fit mechanism, a clamping mechanism or any other suitable coupling mechanism. A first genset module 121 is positioned within the second internal volume and configured to be operably coupled to the genset engine 102 through the first opening 103. The first genset module 121 can include, for example, an air handling module, an aftertreatment module, a control module, an organic Rankine cycle generator, a combined heat and power module, a trigeneration module, an electrical cabinet, a fuel tank, a fuel handling module, a buss bar, starting batteries, hybrid batteries, a switch gear, or any other genset module.

In one exemplary implementation, the first genset module 121 can include an air handling module. In such implementations, the second enclosure 120 is sized and shaped to house the air handling module. For example, the second enclosure 120 has a size of 20 feet. An outlet of the first genset module 121 can be coupled to an air intake of the genset engine 102 through the first opening 103. The first genset module 121 can be mounted on a first genset module chassis 122. The first genset module chassis 122 is configured to engage and be removably coupled to the genset engine chassis 112 through the first opening 103. The first genset module chassis 122 can be removably coupled to the genset engine chassis 112 via locks, pins, nuts, bolts, a snap-fit mechanism, a clamping mechanism or any other suitable coupling mechanism. In various embodiments, the first genset module chassis 122 can be configured to align with a neutral axis of the genset engine chassis 112 to limit the transmission of genset engine 102 vibrations from the genset engine chassis 112 to the first genset module 121, for example, reduce the vibrations relative to any coupled enclosures which do not use the first genset module chassis 122 and other features described herein, or do not have the neutral axes of the first enclosure 110 and the second enclosure 120 aligned. The coupling of the first genset module chassis 122 to the genset engine chassis 112 serves to couple the first enclosure 110 to the second enclosure 120.

The third enclosure 140 defines a third internal volume and is positioned adjacent to the second side 113 and removably coupled to the second side 113 of the first enclosure 110. For example, the third enclosure 140 can be touching the second side 113 (e.g., abut the second side 113), positioned within a predetermined distance of the second side 113 but not touching the second side 111, or a portion of the third enclosure 140 inserted into second side 113 of the first enclosure 110. The third enclosure 140 can be coupled to the second side 113 using nuts, screws, bolts, locking pins, a snap-fit mechanism, a clamping mechanism or any other suitable coupling mechanism. A second genset module 141 is positioned within the third internal volume and configured to be operably coupled to the genset engine 102 through the first opening 103. The second genset module 141 can include, for example, an air handling module, an aftertreatment module, a control module, an organic Rankine cycle generator, a combined heat and power module, a trigeneration module, an electrical cabinet, a fuel tank, a fuel handling module, a buss bar, starting batteries, hybrid batteries, a switch gear, or any other genset module.

In one exemplary implementation, the second genset module 141 can include a control module configured to control and/or monitor operations of the genset engine 102. In such implementation, the second enclosure 120 is sized and shaped to house the control module. For example, the second enclosure 120 has a size of 20 feet. Electrical leads, sensors and/or other electrical components of the control module 14 can be operatively coupled to the genset engine 102 through the second opening 105. In some embodiments, the second genset module 141 is mounted on a second genset module chassis 142 which can be substantially similar to the first genset module chassis 122 and configured to engage and be removably coupled to the genset engine chassis 112 through the second opening 105. The second genset module chassis 142 can be removably coupled to the genset engine chassis 112 via locks, pins, nuts, bolts, a snap-fit mechanism, a clamping mechanism or any other suitable coupling mechanism. The second genset module chassis 142 can be configured to align with a neutral axis of the genset engine chassis 112 to limit the transmission of genset engine 102 vibrations from the genset engine chassis 112 to the second genset module 141, for example, reduce the vibrations relative to any coupled enclosures which do not use the second genset module chassis 142 and other features described herein. Coupling of the second genset module chassis 142 to the genset engine chassis 112 serves to couple the first enclosure 110 to the third enclosure 140, as described herein with respect to the second enclosure 120.

In this manner, a plurality of genset modules can be coupled to the genset engine 102 without having to modify the first enclosure 110 housing the genset engine 102. In some implementations, a plurality of enclosures housing the genset engine 102 or any other module configured to be coupled to the genset engine 102 can be positioned end to end and coupled to each other, for example, a chassis of each of the first genset module chassis 122 can be coupled to the genset engine chassis 112, and the second genset module chassis 142 can be coupled to the first genset module chassis 122. In other implementations, the first enclosure 110 can be sized to accommodate the genset engine 102 as well as one or more modules within the first internal volume. For example, the first genset module 121, the second genset module 141, and/or any other genset modules can be positioned within the first internal volume of the first enclosure 110 and secured to the genset engine 102, for example, a module chassis (e.g., the first or second genset module chassis 122, 142) can be removably coupled to a genset engine chassis (e.g., the genset engine chassis 112) to secure the genset module within the first enclosure 110.

The modular genset enclosure assembly 100 therefore allows the genset engine 102 to be enclosed, housed or otherwise positioned in the first enclosure 110 which can be a standard size container, for example, an ISO 6346 standard sized container. Shipping or enclosing in such standard containers reduces shipping as well as manufacturing costs. For example, the modular genset enclosure assembly 100 can substantially lower shipping costs by cargo ship, air and/or railway. Particularly, shipping by railway requires very stringent size control of the containers loaded on the railway freight cars because of varying terrains, low hanging bridges, utility wires, tunnels, etc. Non-standard size containers therefore create a safety hazard as well incur substantially increase shipping costs, for example, due to the logistical challenge of determining alternate safe railway routes for transporting such non-standard size containers. This issue is resolved by the modular genset enclosure assembly 100. Any other modules which if preassembled with the genset engine 102, can cause the dimensions of the assembly to exceed the dimensions of the first enclosure 110 are shipped separately, for example, loosely or in separated containers which can be removably coupled to the first enclosure 110 and the genset engine 102 on-site described herein.

Furthermore, modular coupling of genset modules can also significantly reduce maintenance cost as well as downtime while performing on-field repairs. For example, to perform maintenance or replacement of a module (e.g., the first genset module 121 or the second genset module 141), the module chassis 122 is uncoupled from the genset engine chassis 112 and the module removed from the genset enclosure 110. The module can be swapped or otherwise replaced with a replacement module to keep the genset running while repairs are performed on the module, thereby reducing downtime. Separating the genset module from the genset engine to perform the maintenance operations can also allow better access to portions of the genset module which might be inaccessible or difficult to access when the genset module is still coupled to the genset engine. Moreover, providing modular coupling/uncoupling of the module to the genset engine can also allow access to various portions of the genset engine (e.g., the genset engine 102) for performing maintenance operations thereon.

In various embodiments, any of the enclosures included in the modular genset enclosure assembly 100 (e.g., the first enclosure 110, the second enclosure 120, and/or the third enclosure 140) or any other genset enclosure assembly described herein, can include an open frame or skid mounted frame, a frame with enclosure closing sidewalls, or an "airplane cargo box" enclosed slide-in module. The enclosures can also include sub-enclosure or sub-modules positioned within a parent enclosure, for example included or positioned in frame of the parent enclosure. Such sub-enclosures of sub-modules can include, for example, open racks and/or enclosed "drawer racks" with plug-in sub-modules (e.g., starter batteries, control modules, etc.). In some embodiments, the rack or enclosed modules can also be free standing/enclosure end-plug style, or a sub-frame connected to genset engine chassis (e.g., a genset skid frame).

Environmental sealing, for example, rubber lining, air curtains, or weather resistant tarps, can be provided between the coupled enclosures (e.g., between the first enclosure 110 and the second enclosure 120 and/or between the first enclosure 110 and the third enclosure 140). The environmental sealing can provide sealing of the internal volumes of the enclosures from the external environment so that an internal environment, for example, temperature, pressure, humidity etc. within the enclosure can be maintained to protect the genset engine (e.g., the genset engine 102) or modules contained therewithin from environmental impact. Entry doors and access panels can be also be provided in one or more of the enclosures coupled to each other to allow service personnel access to the enclosures and also access control. Internally facing walls or other walls protecting equipment or personnel of the enclosures can be configured to be shrapnel or arc flash resistant allowing access to controls and critical systems while protecting against mechanical failure, fire, or fuel or electrical explosions. Standard conduits or vent openings in enclosure and modules (e.g., modules disposed within an enclosure) can be standardized and designed to match up upon insertion, allowing for cable, control, or piping passage, cooling, and venting (e.g., battery vents). Standardized conduits, vents, and access doors can be used to allow matching between modules that have been stacked one after each other in the container.

As described before, in some embodiments the genset engine 102 and each module coupled thereto is positioned within the same enclosure (e.g., the first enclosure 110) and removably coupled to the genset in a modular arrangement, for example, using the module chassis. In other embodiments, each module is positioned within its own enclosure (e.g., the second enclosure 120 or the third enclosure 140) and the module enclosure coupled to the genset engine enclosure. The module enclosures (e.g., the first enclosure 120 and the second enclosure 140) can have substantially smaller dimensions relative to the genset engine enclosure (e.g., the first enclosure 110). For example, the module enclosures can include 10 feet long or 20 feet long ISO containers which can be coupled on-site to the genset engine enclosure.

The genset engine enclosure and module enclosures can be coupled end to end coupling to create an on-site extra-long container (as shown in FIG. 1), or side-by-side (e.g., with a jointly coupled side access door or panel to allow cable, controls, duct and piping connection or personnel access). In particular embodiments, a remote coupling can be allowed through use of weather grade conduit/piping, or a weatherproof channel/duct. In some embodiments, modular coupling can allow sharing of common support modules between multiple gensets, such as at large genset farms, at data centers or mining or petroleum sites. Common module enclosures can be placed between two genset enclosures and directly connected side-to-side with the two genset enclosures or connected with umbilical connections (e.g., channel connectors). Alternatively, the common support module can be placed at either end or in the middle and connections daisy chained from enclosure to enclosure or placed in the middle of a star configuration with individual connections to each genset.

Figure 2:
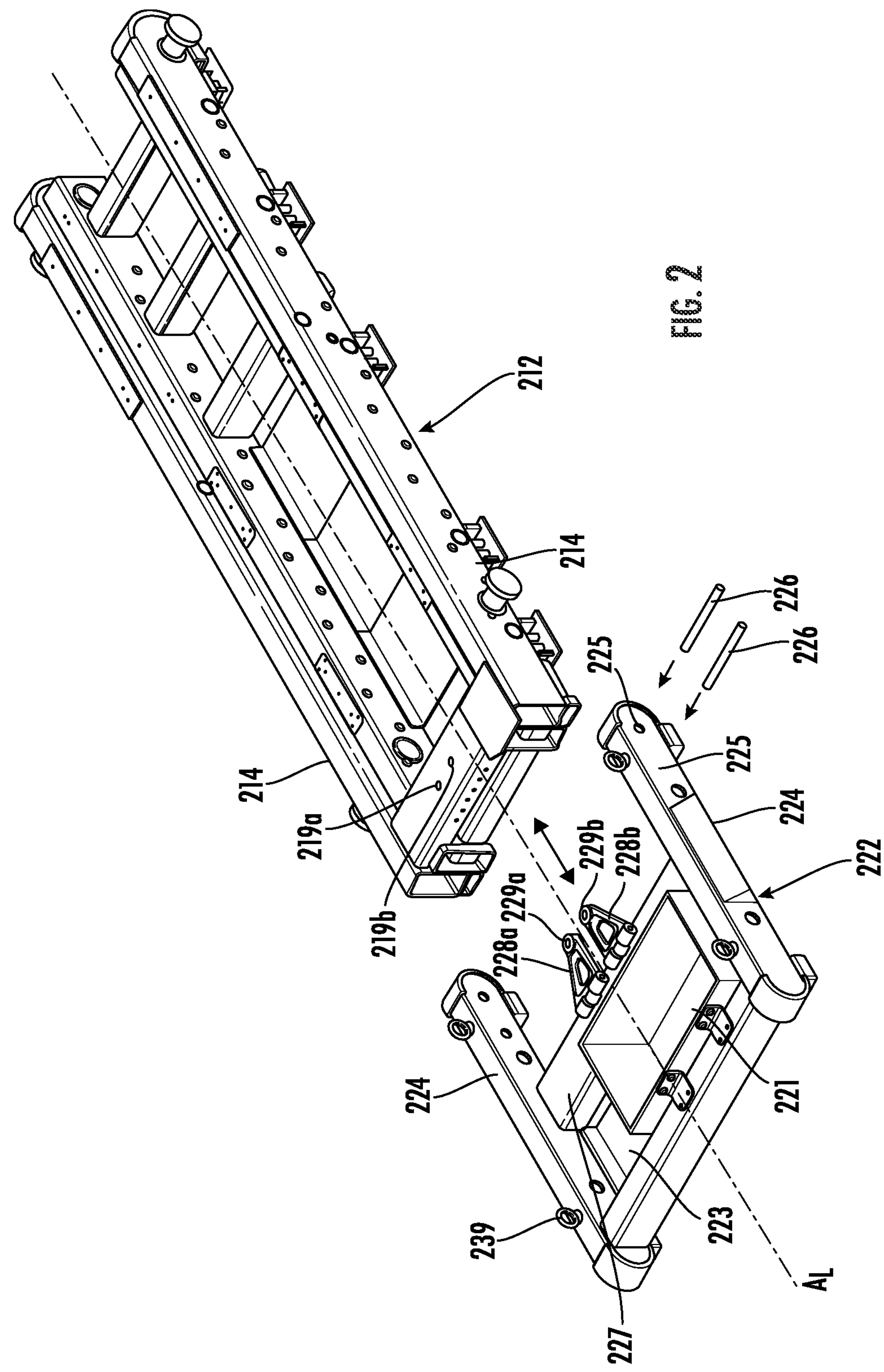
FIG. 2 is a perspective view of a module chassis configured to be removably coupled to a genset engine chassis.

As described above, a genset module can be coupled or otherwise secured to a genset engine via a module chassis on which the genset module is mounted. FIG. 2 is a perspective view of a module chassis 222 configured to be coupled to a genset engine chassis 212, as described therein. A genset module (e.g., the air handling module 220 shown in FIG. 16) can be installed on the module chassis 222, for example, any of the genset modules described before herein with respect to FIG. 1. The module chassis 222 is structured to limit vibration transmission from a genset engine (e.g., the genset engine 102 or 20) to the genset module mounted on the module chassis 222 (e.g., relative to a system which does not include the module chassis 222) while allowing at least some movement (e.g., linear displacement and/or rotation) of the genset module mounted thereon relative to the genset engine, as described in further detail herein.

The genset engine chassis 212 includes a pair of struts 214 and is configured to mount a genset engine (e.g., the genset engine 102 or 20) thereon. The module chassis 222 includes a pair of arms 224. At least portion of each arm 224 included in the pair of arms 224 is configured to be positioned adjacent (e.g., abutting, contiguous, positioned next to but not touching, positioned in the same plane, etc.) to at least a portion of the pair of struts 214 included in the genset engine chassis 212 such that the pair of arms 224 are in the same plane as the pair of struts 214. In some embodiments, a distance between the pair of arms 224 is larger than a distance between the pair of struts 214. In such embodiments, the pair of arms 224 are configured to be positioned on either side of the pair of struts 214 so that the pair of struts 214 are located adjacent to and between the pair of arms 224. In other embodiments, the distance between the pair of arms 224 can be smaller than the distance between the pair of struts 214, so that the pair of arms 224 are configured to be positioned adjacent to and between the pair of struts 214.

A plurality of openings 225 are defined in each arm 224. A pin 226, for example, a lock pin can be inserted through each opening. The pins 226 can include quick connect bolts or pins. A plurality of eye-bolts 239 are also positioned on each arm 224. The pins 226 and the eye-bolts 239 can provide mechanical linkage or otherwise couplings for lifting and transporting the module chassis 222 and thereby, the genset module mounted thereon. The pins 226 can be removed once the module chassis 222 is coupled to the engine chassis 212, as described herein.

A cross-bar 227 is positioned between the pair of arms 224. The cross-bar 227 is oriented orthogonal (e.g., positioned at or near an angle of 90 degrees or at an angle of 85 to 95 degrees, 80 to 100 degrees, 75 to 105 degrees, or 70 to 110 degrees inclusive of all ranges and values therebetween) to the arms 224 and coupled (e.g., welded, screwed, bolted, riveted, etc.) to each of the pair of arms 224. A first bracket 228*a* and a second bracket 228*b* (also referred to herein as "the pair of brackets 228") are positioned on the cross-bar 227 and configured to be removably coupled to mating receptacles 219*a*, 219*b* defined on the genset engine chassis 212.

Expanding further, the pair of brackets 228 can be triangular in shape. A first end of the pair of brackets 228 is hingedly mounted on the cross-bar 227. For example, the pair of brackets 228 can be mounted on the cross-bar 227 using any pivot mount, for example, a swivel mount or a ball-joint mount. A first aperture 229*a* and second aperture 229*b* are defined on a second end of the first bracket 228*a* and the second bracket 228*b* respectively, the second end being opposite the first end. The first aperture 229*a* is configured to be aligned with a first receptacle 219*a*, and the second aperture 229*b* is configured to be aligned with a second receptacle 219*b* of the genset engine chassis 212. The receptacles 219*a*, 219*b* are also located on either side of the neutral axis of the genset engine chassis 212. A pin (e.g., the pin 226) can be inserted through the apertures 229*a*, 229*b* and the mating receptacles 219*a*, 219*b* to allow coupling of the module chassis 222 to the genset engine chassis 212. The pair of brackets 228 can be coupled to mating receptacles 219*a*, 219*b* using quick connect bolts or pins. Pivotally mounting the pair of brackets 228 on the cross-bar 227 can allow rotational movement of the second end of the brackets 228 about the cross-bar to facilitate alignment of the apertures 229*a*, 229*b* with the receptacles 219*a*, 219*b*.

The pair of brackets 228 are located proximal to a neutral axis $A_L$ of the genset engine chassis 212. As shown in FIG. 2, the first bracket 228*a* of the pair of brackets 228 is located on one side of the neutral axis $A_L$ and the second bracket 228*b* of the pair of brackets 228 is positioned on a second side of the neutral axis $A_L$ opposite the first side. The location of the brackets 228 is configured to minimize communication or otherwise transmission of vibrations produced by a genset engine (e.g., the genset engine 102 or 20) mounted on the genset engine chassis 212 to the module chassis 222 and thereby, to a genset module mounted thereon relative to any other coupling mechanism or methods which do not use the features described herein. For example, the pair of brackets 228 can align a neutral axis of the module chassis 222 with the neutral axis $A_L$ of the genset engine chasses 212.

Furthermore, the pair of brackets 228 provide geometric alignment of the module chassis 222 with the genset engine chassis 212 to limit overstressing of connections between the genset module and the genset engine (e.g., oil, coolant and/or air flexible connections). Pivotal mounting of the brackets 228 to the cross-bar 227 can allow the brackets 228 to rotatably displace relative to the module chassis 222 even after the pair of brackets 228 are coupled to the mating receptacles 219*a*, 219*b*, while limiting angular motion within the plane of the module chassis 222 and the genset engine chassis 212. A significant portion of the vibration produced by the genset engine and communicated to the pair of brackets 228 via the genset engine chassis 212 is absorbed by rotational motion of the pair of brackets 228, limiting the amount of vibration transmitted to the modules chassis and the genset module. Limiting vibration transmission from the genset engine to the genset module can limit mechanical damage to the module assembly, increasing service life and lowering service cost.

In some embodiments, a base 223 of the module chassis 222 can define an oil tank, for example, to store oil or otherwise a lubricant for providing to components of the genset module (e.g., the air handling module 220) mounted on the module chassis 222. Furthermore, a second oil tank 221 can also be removably coupled to the module chassis 222 and can serve as an oil or otherwise lubricant tank for providing additional oil or otherwise lubricant storage capabilities for the genset engine.

Figure 3:
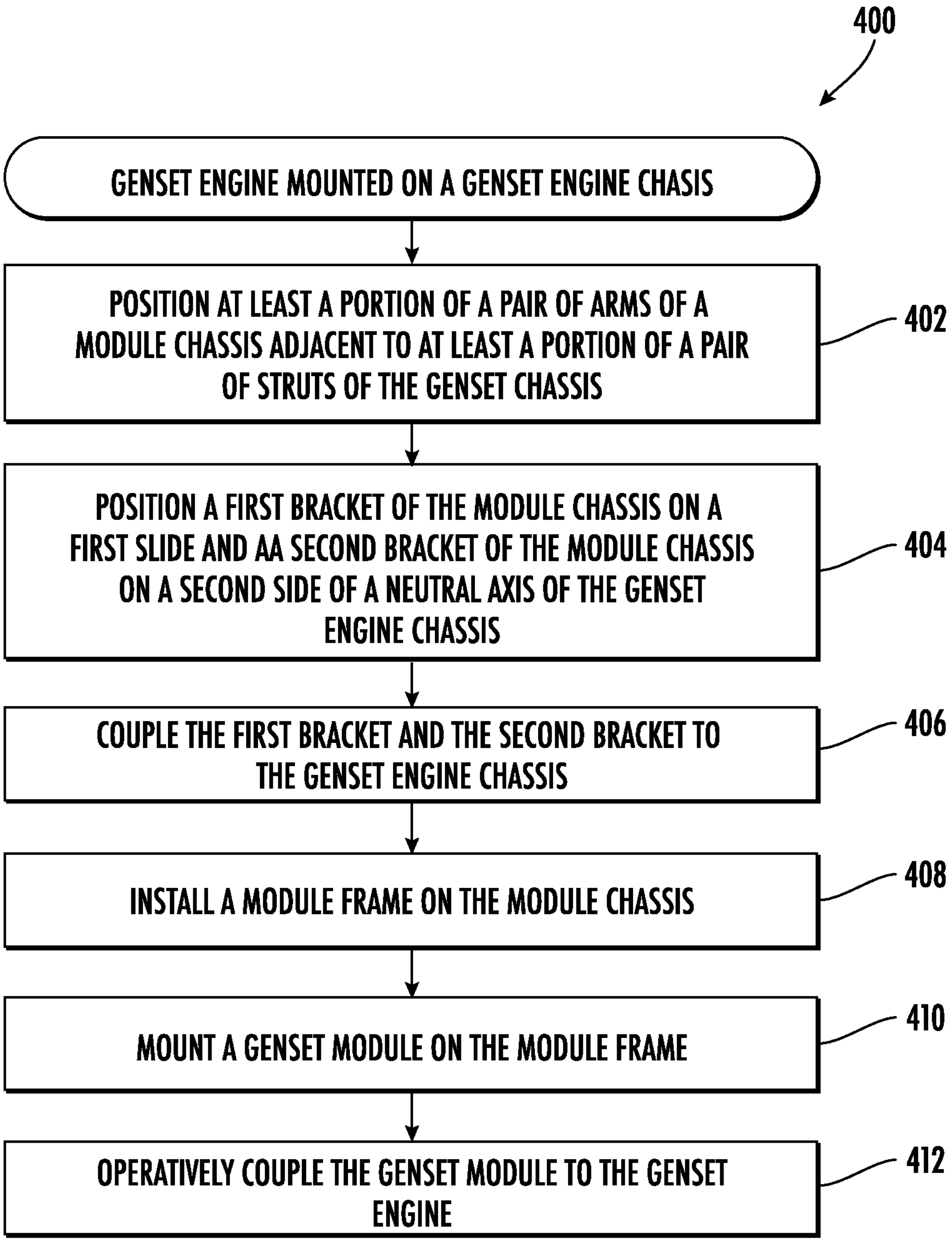
FIG. 3 is a schematic flow diagram of a method for coupling a genset module to a genset engine mounted on a genset engine chassis via a module chassis.

FIG. 3 is a schematic flow diagram of a method 400 for coupling a genset module with a genset engine mounted on a genset engine chassis, for example, the genset engine chassis 212 using a module chassis, for example, the module chassis 222. The module chassis is structured to limit transmission of vibrations generated by the genset engine to the genset module when compared with a genset module coupled to the genset engine using any other coupling means or methods.

The method 400 includes positioning at least a portion of a pair of arms of a module chassis adjacent to at least a portion of a pair of struts of the genset chassis at 402. For example, the pair of arms of the module chassis (e.g., the module chassis 222) are placed adjacent to (e.g., abutting, contiguous, positioned next to but not touching, etc.) to at least a portion of the pair of struts included in the genset engine chassis (e.g., the genset engine chassis 212) such that the pair of arms are in the same plane as the pair of struts. In some embodiments, a distance between the pair of arms can be larger than a distance between the pair of struts so that the pair of arms can be positioned on either side of the pair of struts and the struts are located adjacent to and between the pair of arms. Conversely, the distance between the pair of arms can be smaller than the distance between the pair of struts 214 so that the pair of arms 224 are positioned adjacent to and between the pair of struts.

A first bracket of the module chassis is positioned on a first side and a second bracket of the module chassis is positioned on a second side of a neutral axis of the genset engine chassis at 404. For example, the first bracket (e.g., the first bracket 228*a*) and the second bracket (e.g., the second bracket 228*b*) can be positioned on the module chassis (e.g., the cross-bar 227 of the module chassis 222) such that when the pair of arms (e.g., the pair of arms 224) of the module chassis are positioned adjacent to the pair of struts (e.g., the pair of struts 214) of the genset engine chassis, the first bracket and the second bracket are positioned on either side of the neutral axis of the genset engine chassis.

The first bracket and the second bracket are coupled to the genset engine chassis at 406. For example, the first and second bracket can include the pair of brackets 228 which include the apertures 229*a*, 229*b* respectively defined therein on the second end of the pair of brackets 228. The apertures 229*a*, 229*b* can be aligned with mating receptacles 219*a*, 219*b* defined on the genset engine chassis 212 and coupled thereto using pins or quick connect bolts as described before herein. The mating receptacles 219*a*, 219*b* are also located on either side of the neutral axis of the genset engine chassis 212 so that the pair of brackets 228 remain positioned on either side of the neutral axis of the genset engine chassis 212 after the module chassis 224 and the genset engine chassis 212 are coupled.

A module frame is installed on the module chassis 408. For example, the module frame 230, 330 or any other module frame described herein is mounted on the module chassis as described above herein. A genset module is mounted on the module frame at 410. For example, the air handling module 220 or any other genset module described herein is mounted on the module frame as described before herein. The genset module is operatively coupled to the genset engine at 412. For example, the genset module can include an air intake conditioning module (e.g., the air intake conditioning module 52), a control module (e.g., the control module 54), an air handling module (e.g., the air handling module 220), and/or various other types of modules.

Coupling of the genset module to the genset engine via coupling of the module chassis to the engine chassis limits the transmission of vibration from the genset engine to the genset module relative to a coupling system or method that does not include the module chassis and other features described herein. For example, the pair of brackets (e.g., the pair of brackets 228) align the neutral axis of the module chassis (e.g., the module chassis 222) with the neutral axis of the genset engine chasses (e.g., the genset engine chassis 212). In this manner, the pair of brackets provide geometric alignment of the module chassis with the genset engine chassis to limit overstressing of connections between the genset module and the genset engine (e.g., oil, coolant and/or air flexible connections).

Furthermore, the brackets (e.g., the pair of brackets 228) can be pivotally mounted on the module chassis, for example, hingedly mounted, pivotally mounted, mounted via a swivel mounts, or via a ball joint mount or rubber bushings. Pivotal mounting of the brackets can allow the brackets to rotatably move or displace relative to the module chassis even after the pair of brackets are coupled to the genset engine chassis (e.g., via the mating receptacles 219*a*, 219*b*). In some embodiments, in which the brackets are hingedly mounted, the brackets can also limit angular motion of the genset module within the plane of the module chassis and the genset engine chassis. Thus, a significant portion of the vibration produced the genset engine and communicated to the pair of brackets via the genset engine chassis can be absorbed by rotational motion of the pair of brackets 228. This limits the amount of vibration transmitted to the modules chassis and thus, the genset module mounted thereon relative to a coupling system or method which does not include the features described herein. Limiting vibration transmission from the genset engine to the genset module can limit mechanical damage to the module assembly, thereby increasing service life and lowering service cost.

Figure 4A:
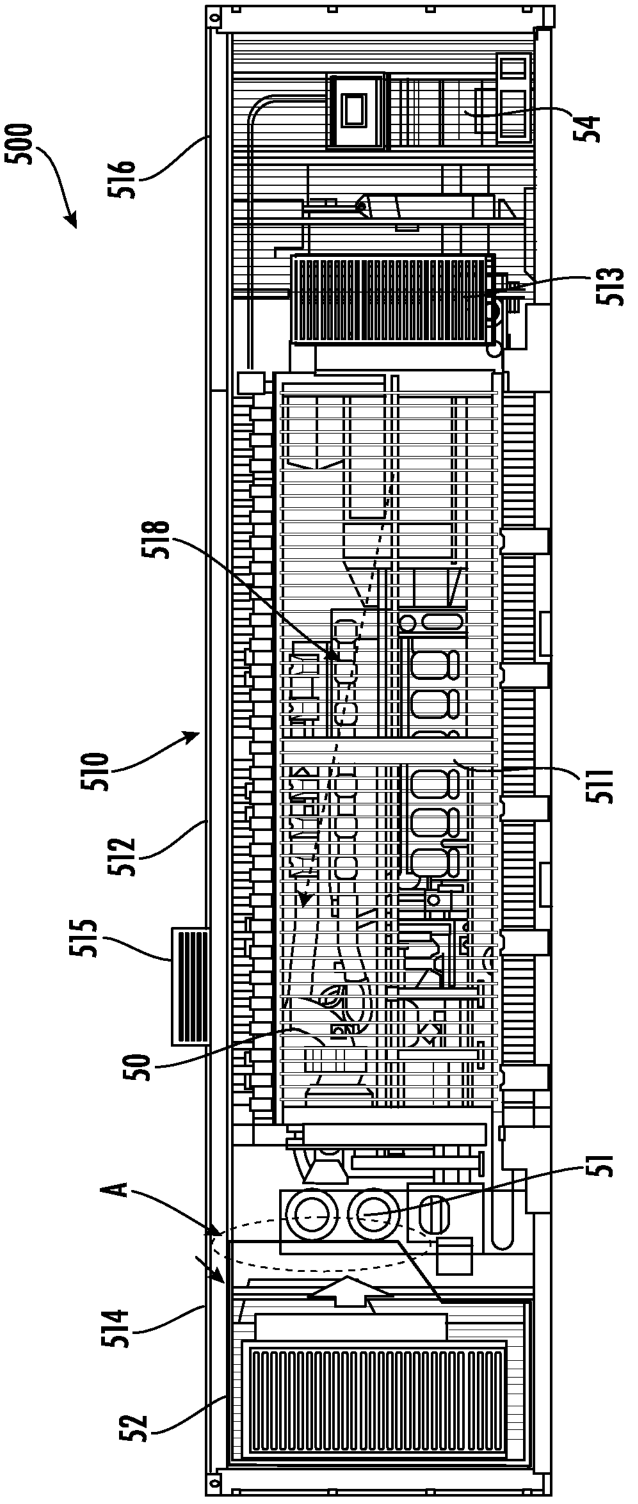
FIG. 4A is a side view of a genset assembly having a genset engine positioned within a first portion of an internal volume of a genset enclosure of the genset assembly. An air intake conditioning module is positioned within a second portion and a control module is positioned within a third portion of the genset enclosure and operatively coupled to the genset engine.

In various embodiments, a genset enclosure can have a size or shape to accommodate a genset engine as well as various genset modules inside an internal volume defined by the genset enclosure. For example, FIG. 4A is a side view of a genset assembly 500 which includes a genset enclosure 510, a genset engine 50, an air intake conditioning module 52 and a control module 54.

The genset enclosure 510 includes a first portion 512 defining a first portion internal volume, a second portion 514 defining a second portion interval volume and a third portion 516 defining a third portion internal volume (collectively referred to herein as "internal volumes"). The genset enclosure 510 can be a standard ISO container or any other container described herein. A genset engine 50 is positioned within the first portion internal volume of the first portion 512. The genset engine 50 can be substantially similar to the engine 10, 20 or any other genset engine described herein. An access panel 511 is provided in a sidewall of the genset enclosure 510 to allow users, for example maintenance personnel to access the genset engine 50 positioned within the first portion internal volume.

Air inlets 513 are also provided on the sidewall of the genset enclosure to allow outside air to be drawn into the first portion internal volume, the second portion internal volume and/or the third portion internal volume. An extractor fan 515 is positioned on a roof of the first portion 512 to pull air from within the genset enclosure 510 through the roof and expel the air into the environment. In this manner, the extractor fan 515 can facilitate an air flow through the genset enclosure 510 as shown by dotted arrow 518 in FIG. 4A, for example to ventilate the genset enclosure 510. In various embodiments, the intake air can be filtered before flowing into the genset enclosure 510.

The air intake condition module 52 (outlined in solid black line) is positioned within the second portion internal volume defined by the second portion 514. The air intake conditioning module 52 is communicatively coupled to an engine air filter module 51 positioned within the first portion internal volume at a location shown by the arrow A. The engine air filter module 51 is operatively coupled to the genset engine 50 and configured to filter intake air provided to the genset engine 50 by the air intake conditioning module 52. The air intake conditioning module 52 can be configured to pre heat air for cold climate operations before the air is delivered to the genset engine 50 via the engine air filter module 51, cool air during operation in hot weather, and/or pressurize air before delivering the air into to the genset engine 50 via the engine air filter module 51.

Figure 4B:
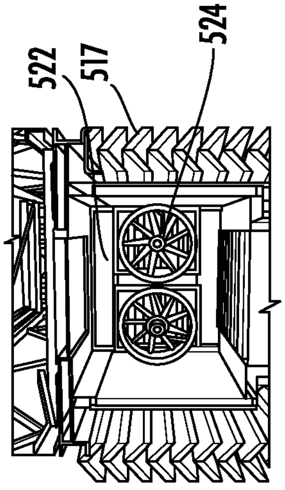
FIG. 4B is an enlarged view of a portion of the air intake conditioning module.

For example, FIG. 4B shows an enlarged view of a portion of the air intake conditioning module 52. The air intake conditioning module 52 includes a heater matrix 522 for heating the air and fans 524 to draw air into the air intake conditioning module 52. Louvres 517 are defined on a sidewall of the second portion 514 to allow air intake into the first portion internal volume by the air intake conditioning module 52.

Figure 5A:
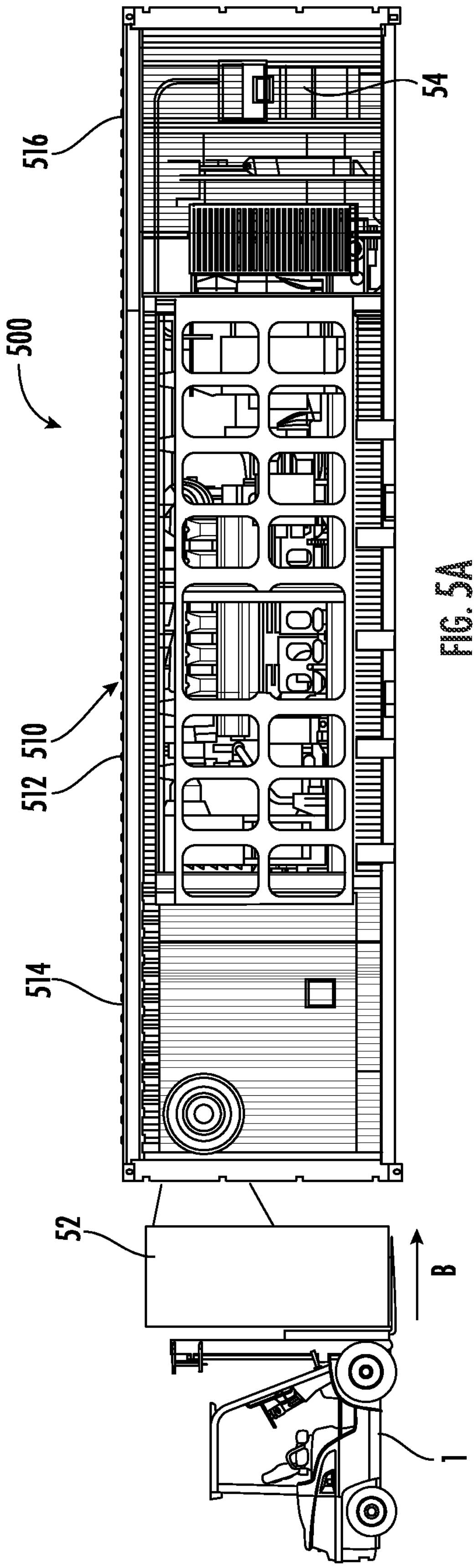
FIG. 5A is a side view of the genset enclosure of FIGS. 4A-B with the air intake conditioning module being positioned in the second portion genset enclosure using a transport equipment.
Figure 5B:
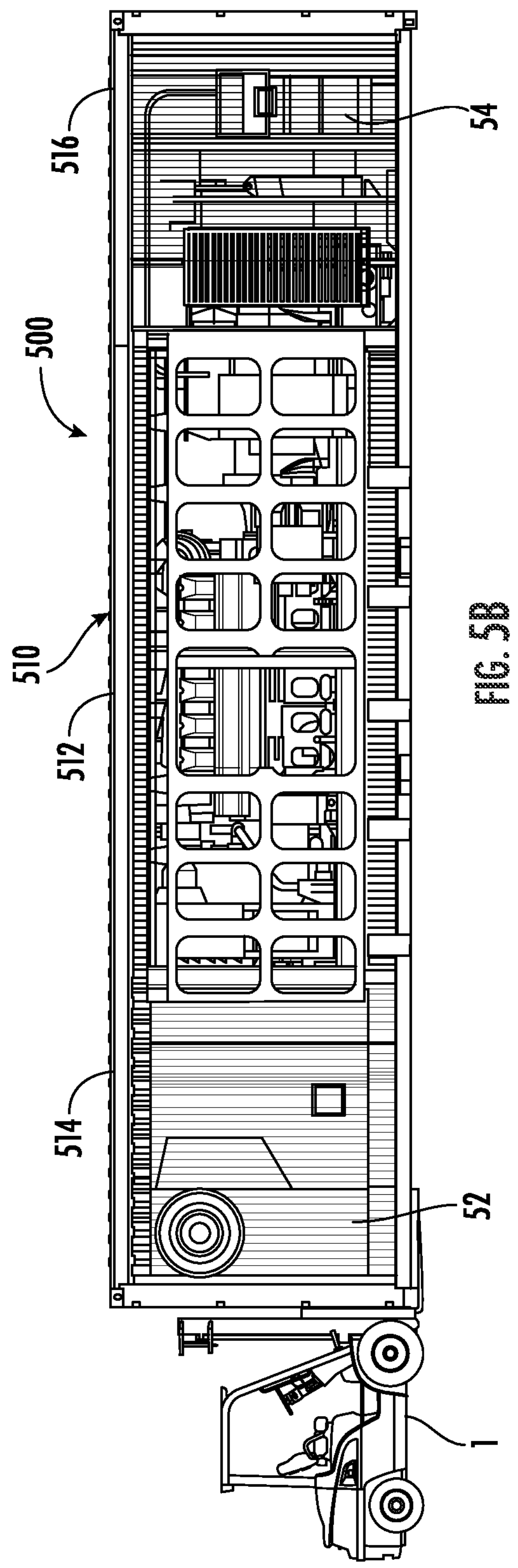
FIG. 5B is a side view of the genset enclosure of FIG. 5A with the air intake conditioning module positioned in the second portion of the genset enclosure and operatively coupled to the genset engine.

FIGS. 5A-B are side views of the genset enclosure 510 showing the air intake conditioning module 54 being positioned, installed or otherwise mounted in the first portion internal volume. The air intake conditioning module 54 can be mounted on a transport equipment 1, for example a forklift as shown in FIGS. 5A-B or any other transport equipment (e.g., a crane). The transport equipment 1 lifts the air intake conditioning module 54 and positions it proximal to an opening defined in a first portion end wall (not shown) of the first portion 514. For example, doors can be installed on the first portion end wall or otherwise form the first portion end wall which can be opened to allow the air intake conditioning module 52 to be inserted into the first portion internal volume.

The transport equipment 1 then inserts the air intake conditioning module 54 into the first portion internal volume in a direction shown by the arrow B (FIG. 5A). Once the air intake conditioning module 52 is positioned inside the first portion internal volume (FIG. 5B), the air intake conditioning module 52 can be operatively coupled to the engine air filter module 51 (e.g., via coupling air ducts, pipes or connectors included in the air intake conditioning module 52 *t* and the air intake filter module 51).

In various embodiments, the genset engine 50 can be mounted on a genset engine chassis (e.g., the genset engine chassis 112 or 212) and the air intake conditioning module 54 can be mounted on a module chassis (e.g., the first genset module chassis 122 or module chassis 222) which are coupled to each other to secure the air intake conditioning module 52 to the genset engine 50. The air intake conditioning module 52 can be configured for low altitude (low pressure) or high altitude (high pressure) operation. Furthermore, the air intake conditioning module 52 can be sized and/or customized for a rating (e.g., power rating) of the genset engine 50 and/or customer requirements. The air intake conditioning module 52 can easily be removed from the genset enclosure 510 for maintenance or replacement with minimal effort which can significantly reduce maintenance downtime and cost.

Figure 6:
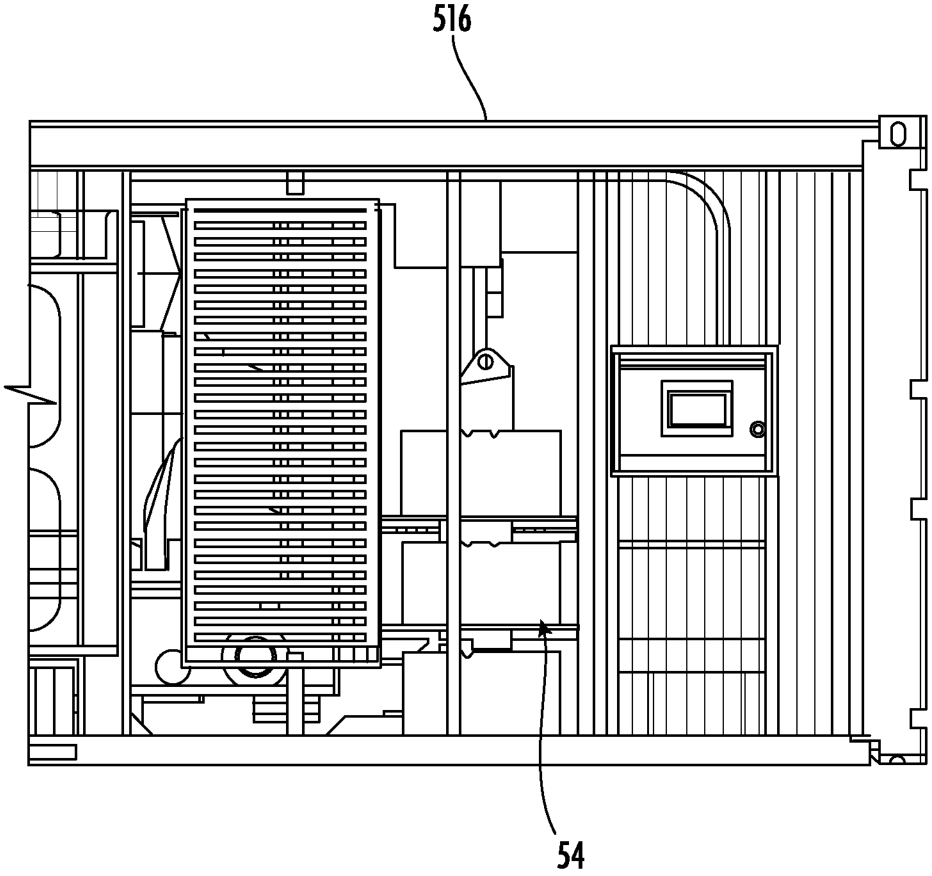
FIG. 6 is an enlarged side view of the third portion of the genset enclosure of FIGS. 4A-B showing the control module positioned within the third portion.
Figure 7B:
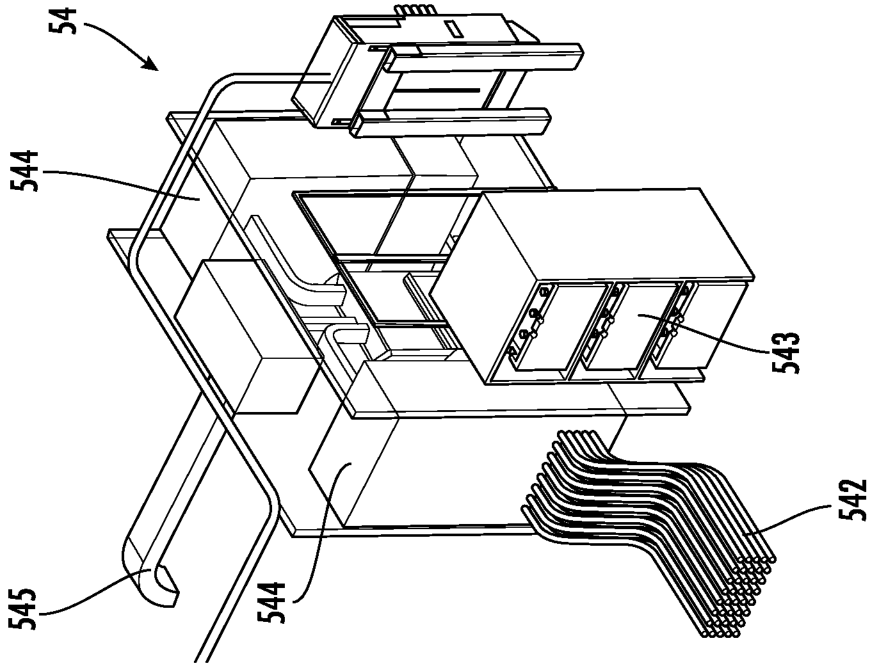
FIG. 7A is a side view and FIG. 7B is a perspective view of the control module of FIG. 6.
Figure 7A:
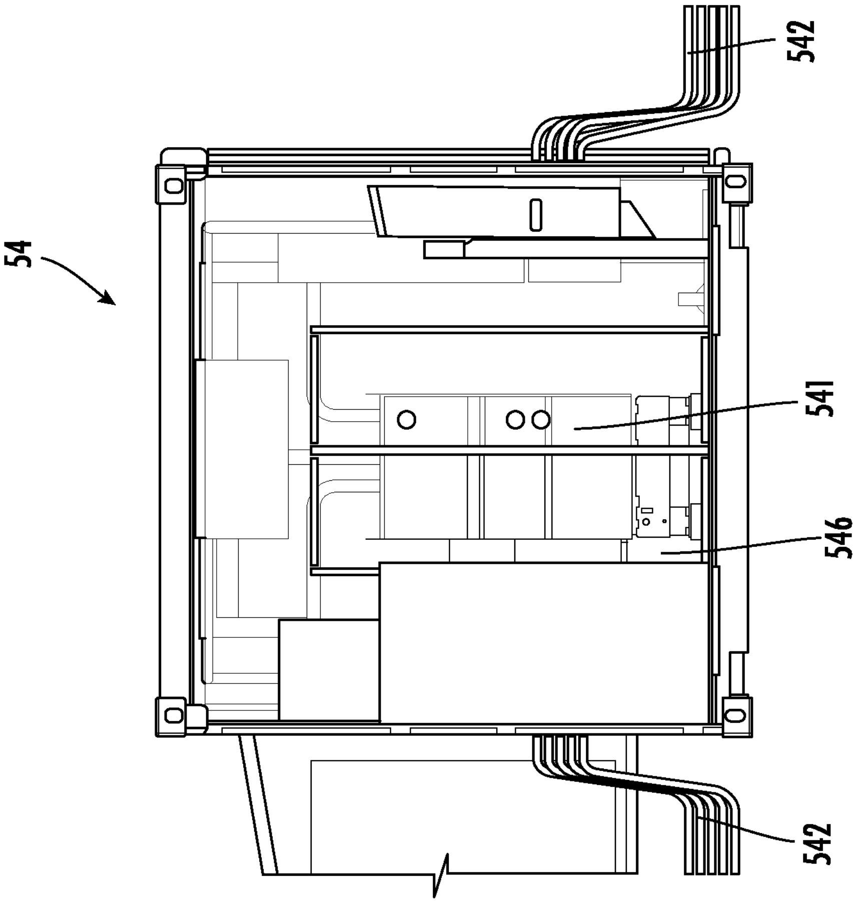

FIG. 6 is an enlarged view of the second portion 516 of the genset enclosure 510 to show the control module 54 positioned within the second portion internal volume. FIG. 7A is a side view of the control module 54 and FIG. 7B is a perspective view of the control module 54. The control module 54 includes a transfer switch box 541, electrical leads 542 which can be used to interface with user equipment and are positioned on either side of the control module 54, a battery pack 543, electrical lead interfaces 544 and a bus bar 545. Blast protection walls 546 can be installed or mounted around the control module 54 to protect the control module 54 from outside accidental explosions or impact forces as well as protect the genset engine and/or maintenance personnel from an electrical short or explosion inside the control module 54.

The control module 54 can be sized and shaped to allow operative coupling with the bus bar 545. The bus bar 545 can be enclosed in a duct and sized, shaped and/or customized based on the rating of the genset engine 50 and/or customer requirements. For example, a length or shape of the bus bar 545 can be customized to allow flexible interface with the genset engine 50, as described in further detail with respect to FIG. 9. The bus bar 545 or any other bus bars described herein (e.g., the bus bar 645) can obviate the routing of multiple electrical cables through the genset engine enclosure 510 for coupling to a generator (e.g., an alternator coupled to the genset engine 50). This is beneficial for low voltage/high current configurations which can include multiple electrical leads 542 (e.g., electrical cables) that are stiff and have limited bend radii, and have to be routed through the genset engine enclosure 510 to a connector box (e.g., connector box 644 as described herein) of the generator (e.g. an alternator) in a confined and restrictive area. The bus bar 545 enables routing of the electrical leads 542 carrying the electrical output produced by the generator coupled to the genset engine 50 to safer and more convenient locations on either side of a compartment or enclosure housing the control module 54

Figure 8A:
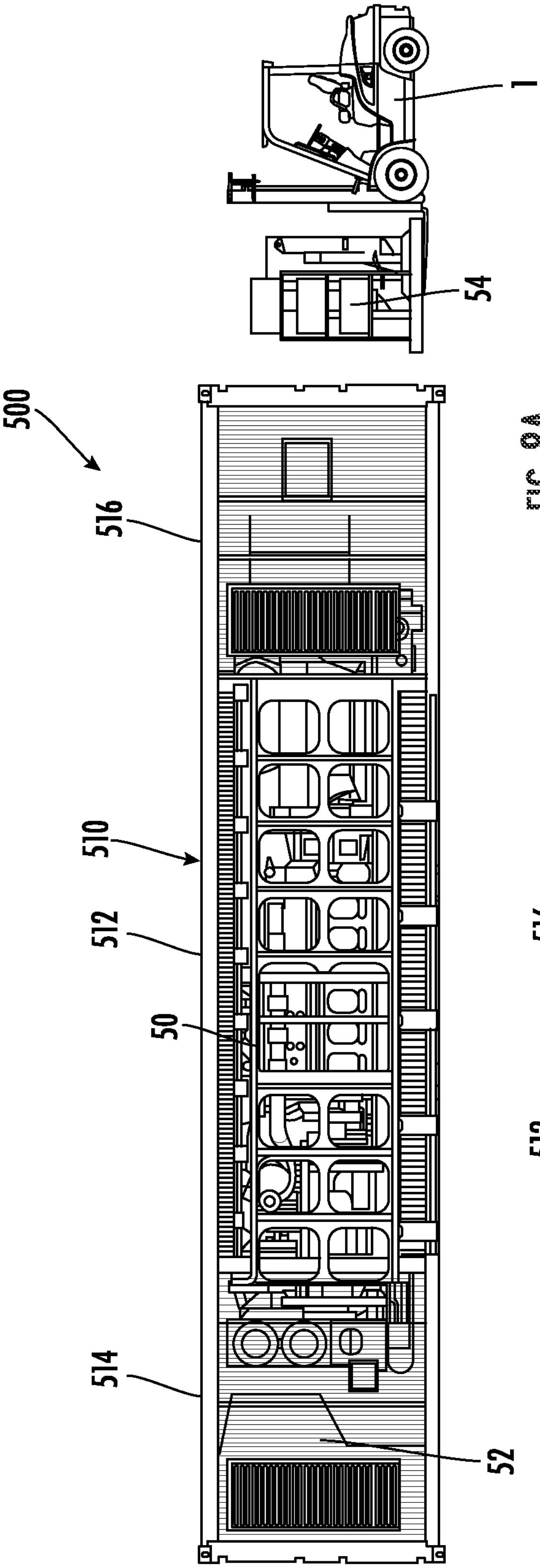
FIG. 8A is a side view of the genset enclosure of FIGS. 4A-B with the control module of FIG. 6 being positioned inside the third portion of the genset enclosure by a transport equipment.
Figure 8B:
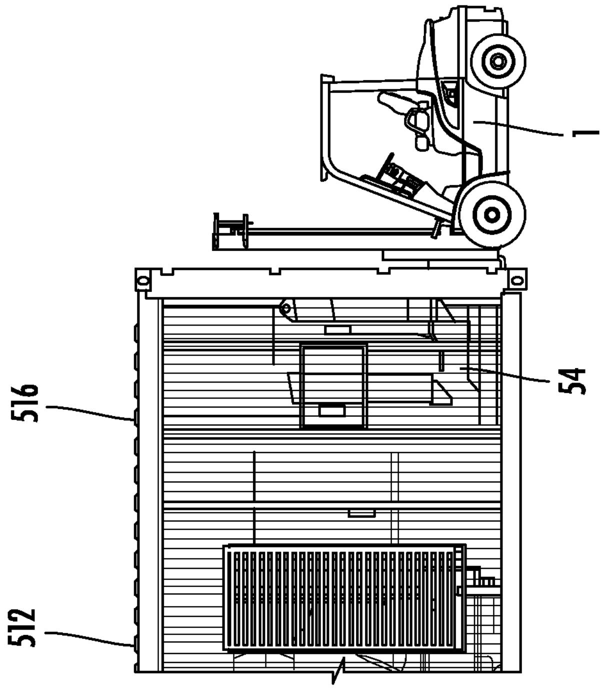
FIG. 8B shows the control module positioned inside the third portion.

FIG. 8A is a side view of the genset enclosure 510 with the control module 54 uncoupled from the genset engine 50. The transport equipment 1 is used to lift and insert the control module 54 into the third portion internal volume of the third portion 516 (FIG. 8B). Once the control module 54 is positioned, mounted or loaded in the third portion internal volume, the control module 54 can be communicatively coupled to the genset engine 50. In particular embodiments, the control module 54 can be mounted on a module chassis (e.g., the first genset module chassis 122 or module chassis 222) which can be coupled to a genset engine chassis (e.g., the genset engine chassis 112 or 212) on which the genset engine 50 can be mounted, thereby securing the control module 54 to the genset engine 50 as described before. It is to be appreciated that while FIGS. 7A-B show a particular embodiment of a control module 54, any other control module can be positioned inside the third portion internal volume and operatively coupled to the genset engine 50.

Figure 9:
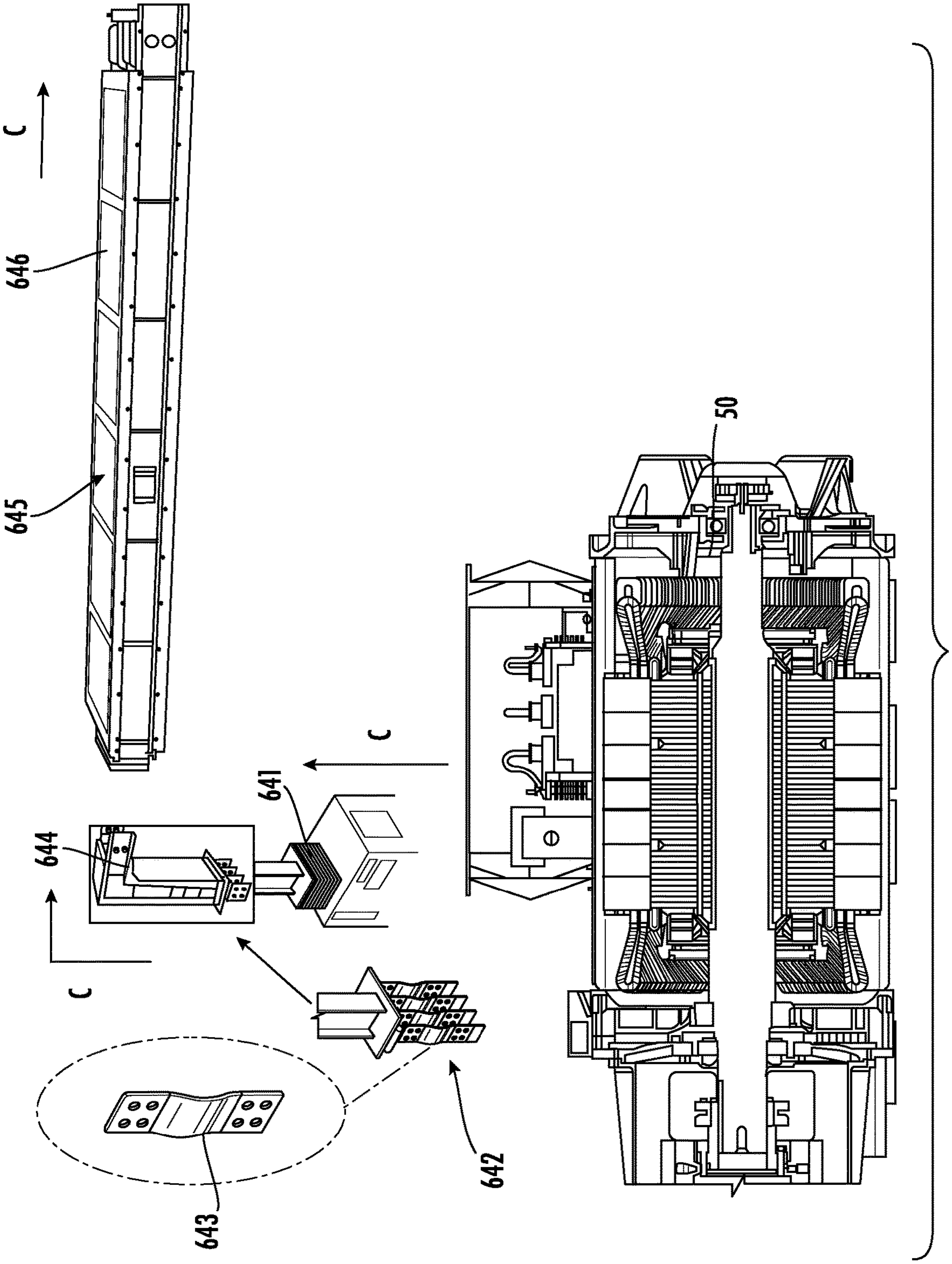
FIG. 9 is a side view of the genset engine of FIGS. 4A-B and various electrical components which can be used to communicatively couple the control module of FIG. 6 to the genset engine.

FIG. 9 shows various electrical components which can be used to allow flexible coupling of a control module (e.g., the control module 54) to the genset engine 50. The control module can be coupled to the genset engine 50 using a connector assembly 642 including a plurality of flexible connectors 643. The flexible connectors 643 can include, for example braid connectors which are flexible and can stretch, compress and/or move sideways to accommodate motion of the genset engine 50 during operation. The connector assembly 642 is communicatively coupled to a bus bar 645 via a connector box 644 (e.g., an alternator connector box). The connector assembly 642 including the braid connections 643 can be covered with flexible bellows 641 to shield the connector assembly 642 as well as accommodate movement of the braid connectors 643 corresponding to the genset engine 50 motion.

The bus bar 645 is contained within covers 646 to protect the bus bar 645 from dust and/or pollution, protect personnel from electrocution by the bus bar 645 and/or allow cooling of the bus bar 645. In various embodiments, the bus bar 645 can be cooled by forcing air inside the covers 646 or a bus bar duct positioned over the bus bar. The forced air can be directed towards the connector box 644, or via air flowing through perforations or otherwise openings defined in the covers 646 disposed over the bus bar 645. Moreover, a length of the bus bar 645 can be adjusted or customized based on a shape or size of the genset engine 50.

Figure 10A:
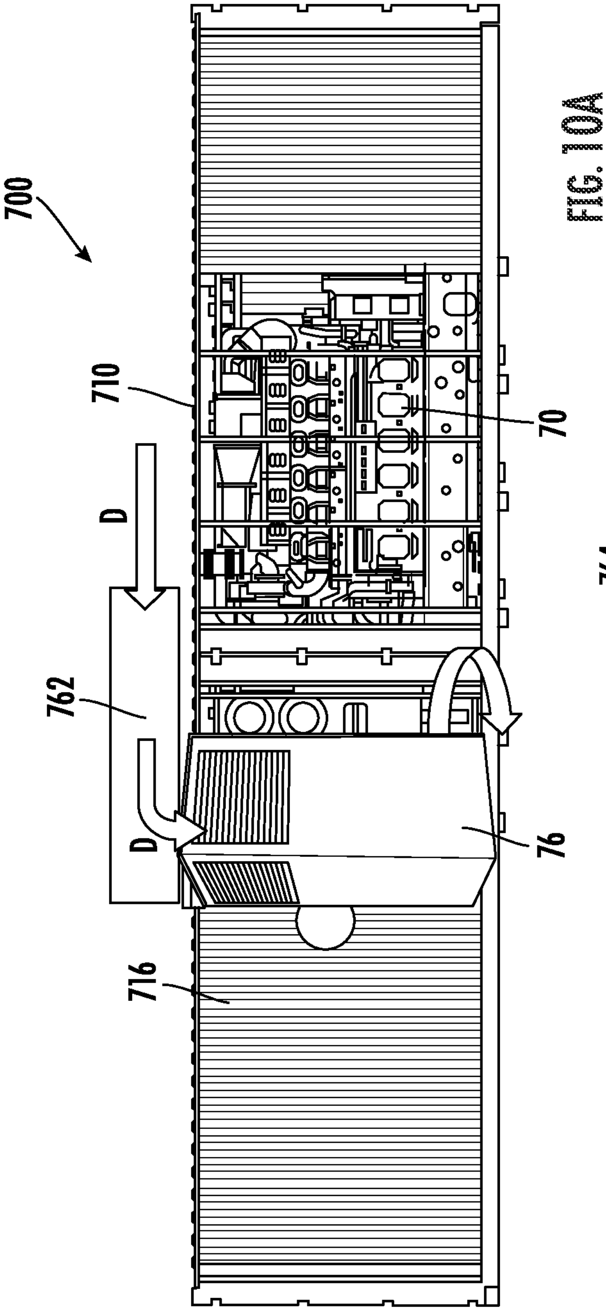
FIG. 10A is a side view of another embodiment of a genset enclosure including a cold climate module operatively coupled to the genset enclosure via an opening defined in a sidewall of the genset enclosure assembly.

In some embodiments, a genset module can be mounted through an opening defined on a sidewall of a genset enclosure. For example, FIG. 10A is a side view of a genset enclosure assembly 700. The genset enclosure assembly 700 includes a genset enclosure 710, a genset engine 70 and a cold climate module 76.

The genset enclosure 710 can include a standard ISO container or any other container described herein. The genset engine 70 is positioned within an internal volume defined by the genset enclosure 710. An opening is defined on a sidewall 716 of the genset enclosure 710. The cold climate module 76 is mounted through the opening such the cold climate module 76 is fluidly coupled to the internal volume defined by the genset enclosure 710. The cold climate module 76 can be operatively coupled to the sidewall 716 of the genset enclosure 710 once the genset enclosure 710 has been installed on-site. This can facilitate transportation as well as reduce transportation costs.

Figure 10B:
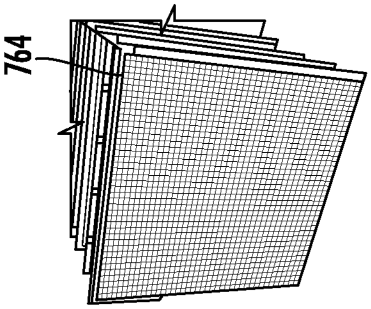
FIG. 10B is a perspective view of a heater unit which can be included in the cold climate module.

The cold climate module 76 can include pre-filters and/or heaters. For example, FIG. 10B shows a heater unit 764 which can be included in the cold climate module 76. The cold climate module 76 can be hingedly mounted on the sidewall 716 of the genset enclosure 710. This can allow the cold climate module 76 to be rotated about the hinge mount, for example to allow access to pre-filters and/or any heaters or containers positioned within the internal volume of the genset enclosure 710. In some embodiments, a second cold climate module can also be mounted on a second sidewall of the genset enclosure 710 opposite the sidewall 716 or on any other sidewall or location of the genset enclosure 710. This can, for example allow at least one of the cold climate modules to remain operational for heating the internal volume of the genset enclosure 710 in situations in which one the cold climate modules is being maintained, repaired or replaced, thereby preventing downtime.

In various embodiments, the cold climate module 76 can also include a heating duct 762 which can be operatively coupled to an aftertreatment system (e.g., a silencer) or an organic Rankine cycle-waste heat recovery (ORC-WHR) system) to recover or otherwise extract heat therefrom. This can be used by the climate control module 76 to heat the internal volume of the genset enclosure 710.

Figure 11:
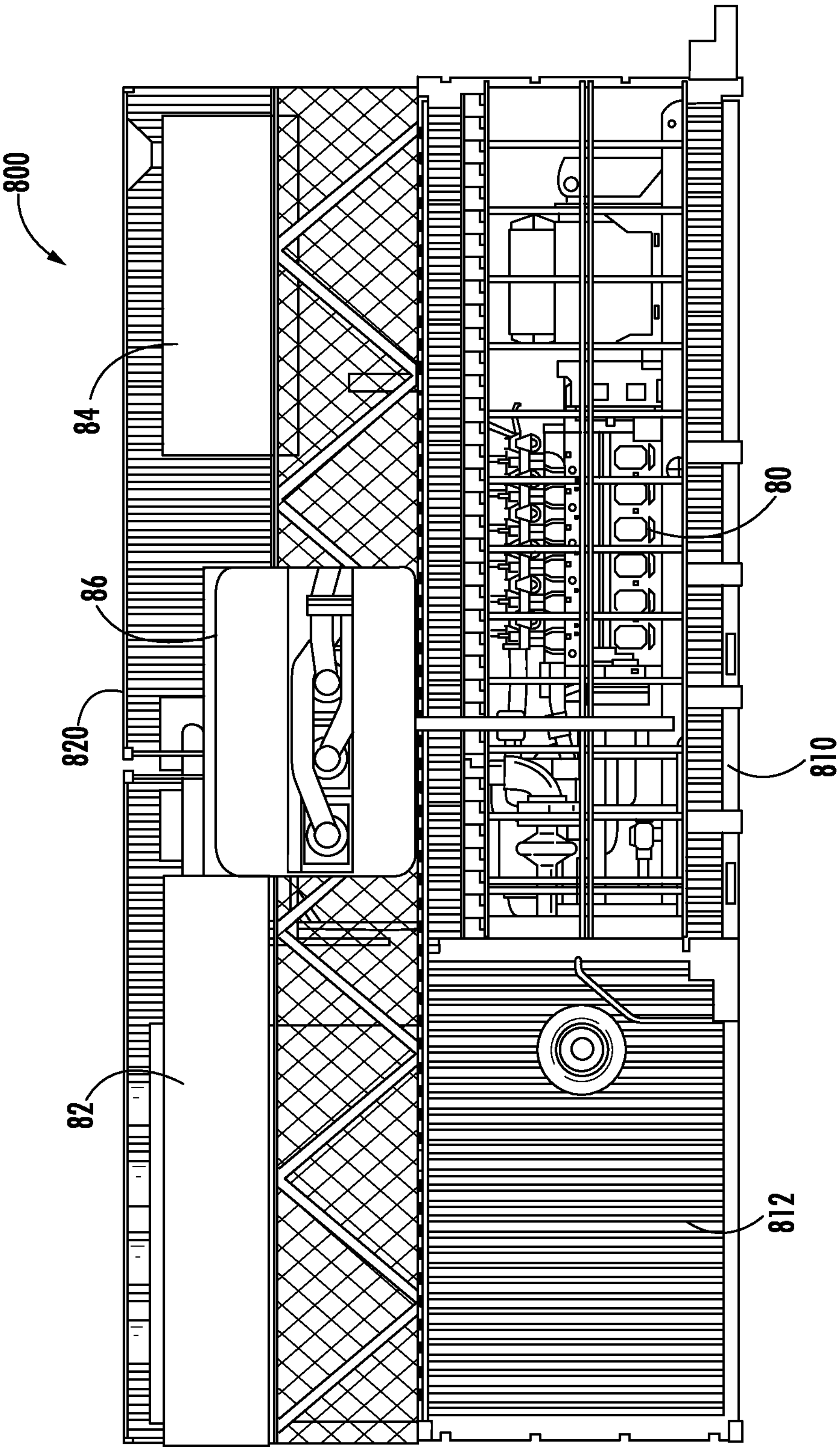
FIG. 11 is a side view of another embodiment of a genset enclosure assembly which includes a bottom enclosure and a top enclosure positioned on top of the bottom enclosure, and including various components positioned therewithin.

FIG. 11 is a side view of another embodiment of a genset enclosure assembly 800. The genset enclosure assembly 800 includes a bottom enclosure 810 and a top enclosure 820. The bottom enclosure 810 can include, for example a standard ISO container or any other container described herein. A genset engine 80 is positioned within an internal volume defined by the bottom enclosure 810. The bottom enclosure 810 can include an air filtration portion 812 which can house an air filtration module, for example, the air intake conditioning module 52 or the air handling unit 220.

The top enclosure 820 is positioned on top of the bottom enclosure 810, for example on a roof of the bottom enclosure 810. The top enclosure 820 can define an internal volume within which a cooling module 82, an ORC-WHR module 86 and an aftertreatment module 84 (e.g., a silencer of the aftertreatment module 84) can be positioned. In some embodiments, the top enclosure 820 is devoid of a roof and includes sidewalls at least a portion of which includes netting or a wire mesh. Thus, air can flow into the internal volume of the top enclosure 820 unhindered such that the top enclosure 820 is naturally ventilated.

The top enclosure 820 can be removably coupled to the bottom enclosure 810. Thus, the bottom enclosure 810 and the top enclosure 820 can be transported separately and coupled on-site. Individual modules can be shipped pre-installed within the bottom enclosure 810 and/or the top enclosure 820, or shipped separately and installed on-site within the bottom enclosure 810 and the top enclosure 820.

Figure 12A:
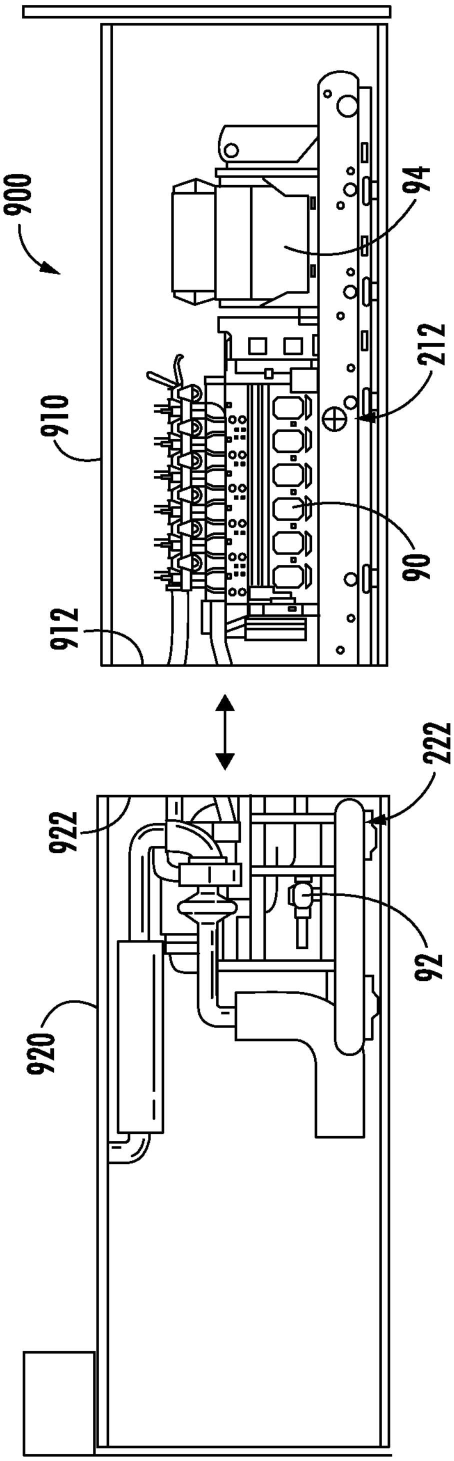
FIG. 12A is a side view of a genset enclosure assembly including a first enclosure containing a genset engine, and a second enclosure containing a first genset module which is coupleable to the first enclosure.
Figure 12B:
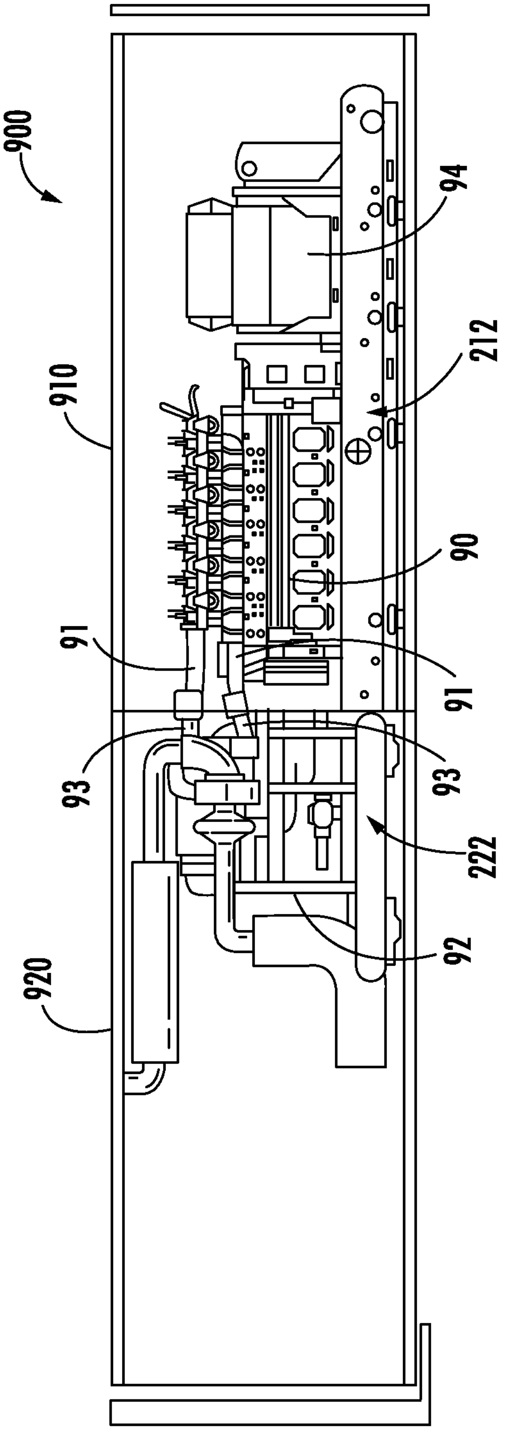
FIG. 12B is another side view of the genset enclosure assembly of FIG. 12A with the first enclosure coupled to the second enclosure and the first genset module operatively coupled to the genset engine.
Figure 13:
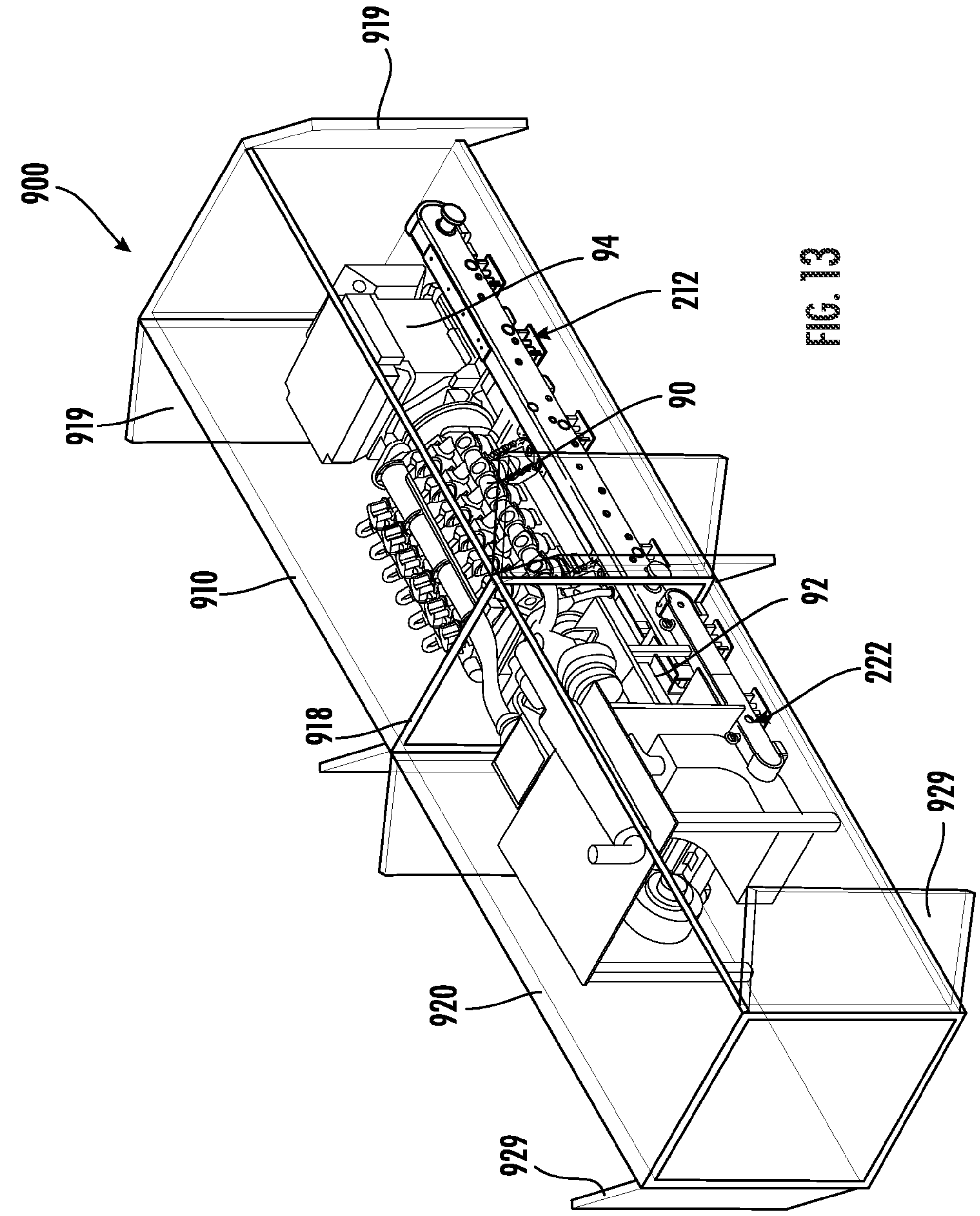
FIG. 13 is a perspective view of the genset enclosure assembly of FIG. 12B.

FIGS. 12A-B and 13 show yet another embodiment of a genset enclosure assembly 900. The genset enclosure assembly 900 includes a first enclosure 910 and a second enclosure 920. The first enclosure 910 defines a first internal volume within which a genset engine 90 is positioned. The genset engine 90 can be substantially similar to the genset engine 102, 20, 50, 60, 70, 80 or any other genset engine described herein. The genset engine 90 is mounted on the genset engine chassis 212, as described before herein. A second genset module 94 is also positioned within the first internal volume. The second genset module 94 can include, for example a control module (e.g., the control module 54). In some embodiments, the first enclosure 910 can include a 40 feet long Hi Cube ISO container.

The second genset module 94 is also installed or mounted on the genset engine chassis 212. In other embodiments, the second genset module 94 can be mounted on a second genset module chassis (e.g., the second genset module chassis 142 or the module chassis 222) which can be removably coupled to the genset engine chassis 212 to secure the second genset module to the genset engine 90. A first enclosure first end 912 of the first enclosure 910 can be devoid of a sidewall or include a removable panel, which can be removed for coupling the first enclosure 910 to the second enclosure 920. A first set of doors 91 (FIG. 13) can also be provided on a first enclosure second end opposite the first enclosure first end 912, for example to allow maintenance personnel to access the second genset module 924 and/or the genset engine 90.

The second enclosure 920 defines a second internal volume. A first genset module 92 is positioned within the second internal volume. As shown in FIGS. 12A-B, the first genset module includes an air handling module, for example the air handling module 220 or the intake air conditioning module 52. The first genset module 92 is installed or mounted on the module chassis 222, as described before. A second enclosure first end 922 of the second enclosure 920 can also be devoid of a sidewall or include a removable panel, which can be removed for coupling the first enclosure 910 to the second enclosure 920. A second set of doors 929 can be provided on a second enclosure second end opposite the second enclosure first end 922, for example, to allow maintenance personnel to access the first genset module 94. In various embodiments, the second enclosure can include a 20 feet long Hi Cube ISO container.

The first enclosure 910 and the second enclosure 920 can be shipped separately to a deployment site and coupled on-site to form the genset enclosure assembly 900. To couple the first enclosure 910 to the second enclosure 920, the first enclosure 910 and the second enclosure 920 are positioned such that the first end 912 of the first enclosure and the second end 922 of the second enclosure 920 face each other. The first enclosure 910 and the second enclosure 920 are moved proximal to each other until the first end 912 is adjacent to the second end 922 (e.g., contiguous, abutting, near but not touching and/or in the same plane).

In some embodiments, the first enclosure 910 and the second enclosure 920 can be coupled via a weather tight overlapping joint 918 (FIG. 13). In other embodiments, the first enclosure 910 and the second enclosure 920 can be coupled via connectors (e.g., coupling brackets, fasteners, etc.) and a weather resistant seal can be positioned over the joint formed between the first enclosure 910 and the second enclosure 920. The module chassis 222 is then removably coupled to the genset engine chassis 212 to secure the first genset module 92 to the genset engine 90. First genset module ducts 93 of the first genset module 92 (e.g., the air handling unit 220) are coupled to corresponding genset engine ducts 91, thereby communicatively coupling the first genset module 92 to the genset engine 90.

Figure 14:
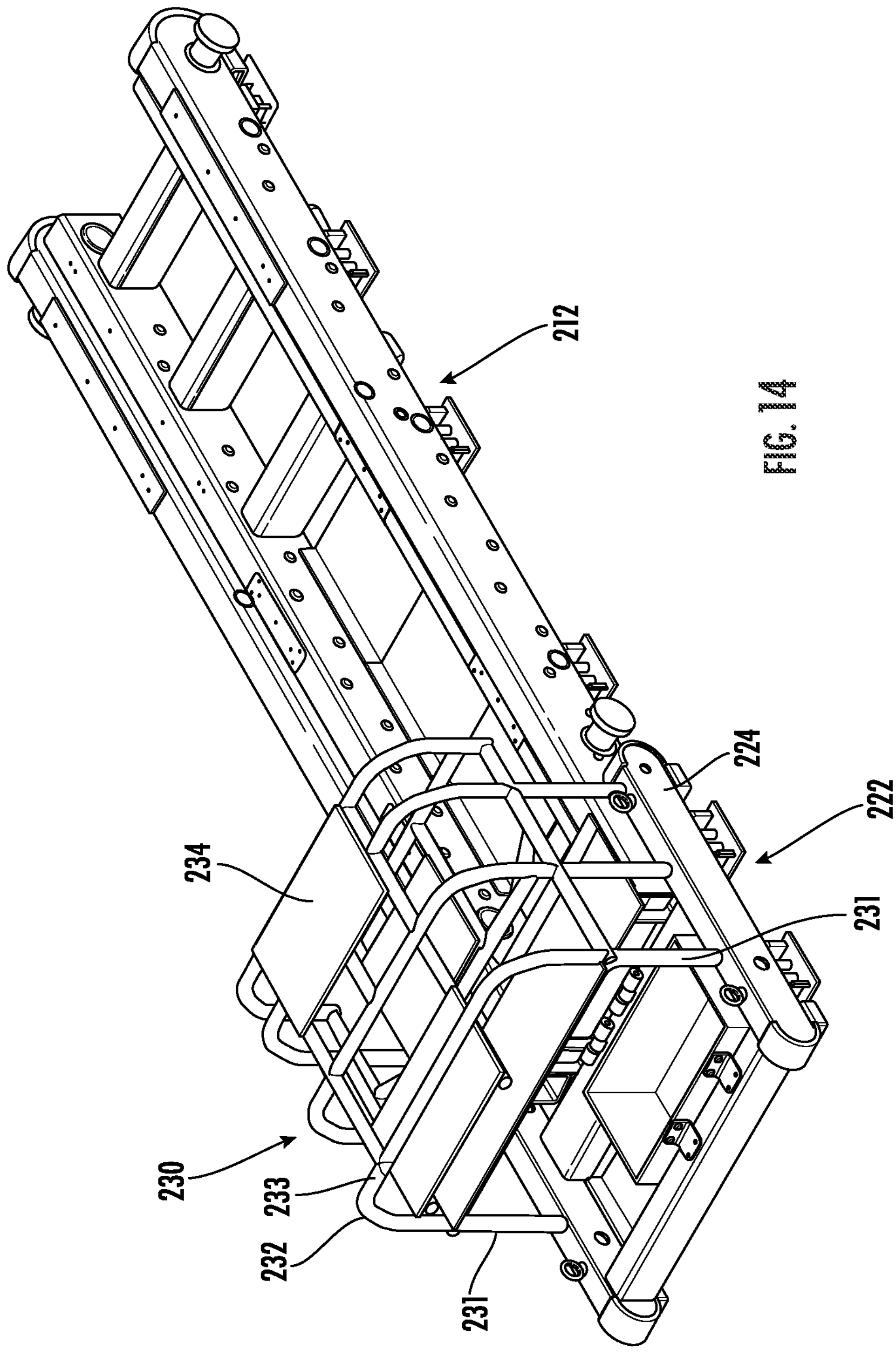
FIG. 14 is a perspective view of a module frame mounted on the module chassis.
Figure 15:
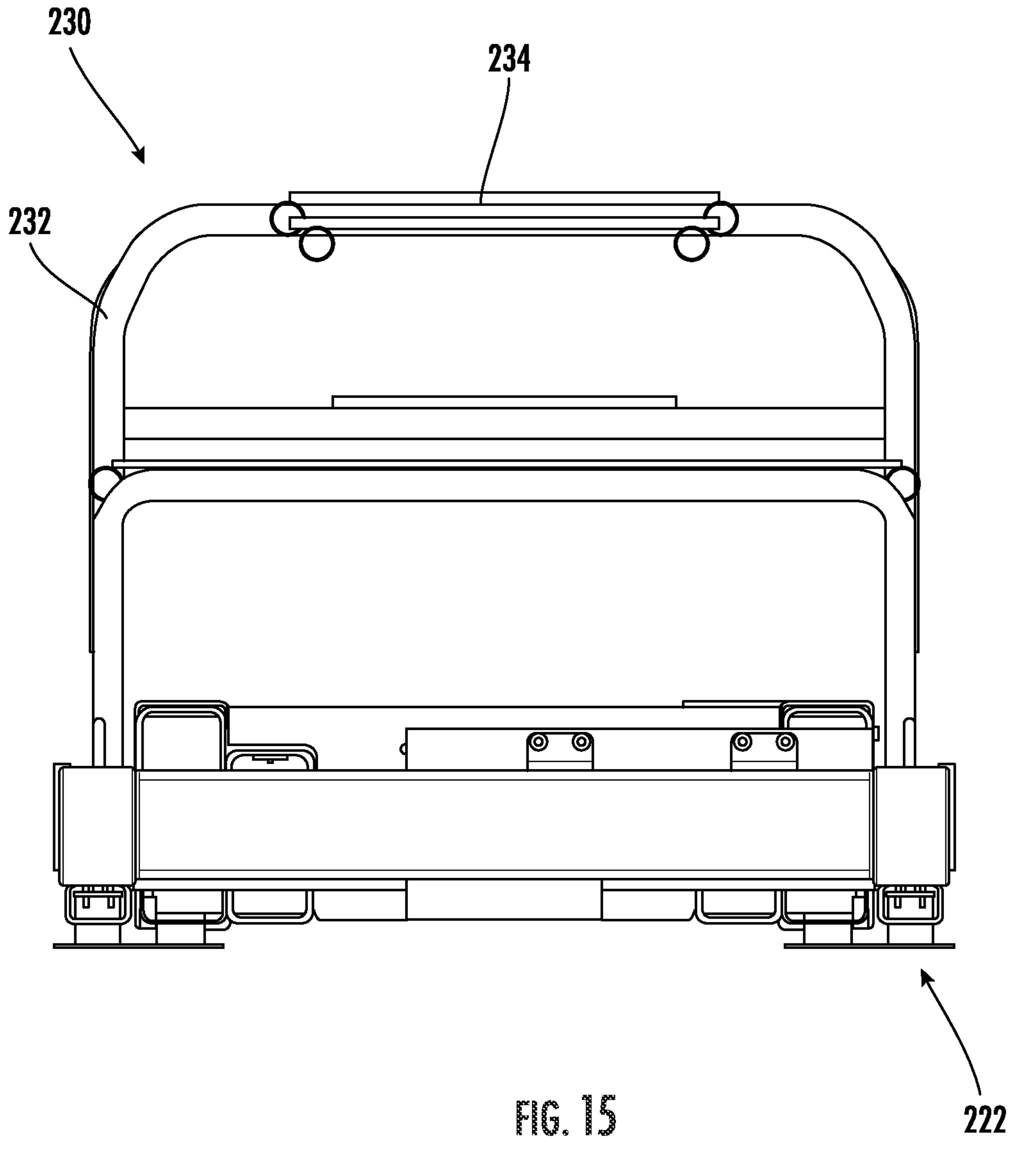
FIG. 15 is a front view of the module frame of FIG. 14.

In various implementations, a module frame can be mounted or installed on a module chassis which is configured to mount various components of a genset module. FIG. 14 shows a module frame 230 coupled to the module chassis 222 according to an embodiment. FIG. 15 is a front view of the module frame 230. The module frame 230 can be used to mount components of an air handling module 220 or any other module on the module chassis 222. The module frame 230 includes a structure including a plurality of legs 232. The plurality of legs 232 include end portions 231 which are disposed orthogonally (e.g., positioned at an angle of 85 to 95 degrees, 80 to 100 degrees, 75 to 105 degrees, or 70 to 110 degrees inclusive of all ranges and values therebetween) on the pair of arms 224 and coupled to each of the pair of arms 224 (e.g., via nuts, bolts, screws or welded thereto). A connecting portion 233 is positioned between the end portions 231 of the legs 232 and connects the end portions 231 of the legs 232. Each leg of the plurality of legs 232 can be a single piece, i.e., the end portions 231 and the connecting portions 233 are formed monolithically (e.g., by bending a rod, tube or bar). In other embodiments, the end portion 231 and the connecting portion 233 can include separated elements which are fixedly coupled together (e.g., via welding). Cross-bars or struts can also be provided to reinforce the module frame 230.

At least one platform 234 is positioned between the plurality of legs 232. The one or more platforms 234 are configured to mount at least one component of the genset module (e.g., the air handling module 220) thereon. For example various components of the genset module can be positioned on different platforms 234 of the module frame 230 and mounted thereto via screws, nuts bolts, etc. The various components can then be operatively coupled to each other to assemble the genset module. In various embodiments, the genset module can first be mounted on the module frame 230 and the module frame 222 can then be installed on the module chassis 222 before coupling the module chassis 222 to the genset engine chassis 212. Alternatively, the module chassis 222 can first be coupled to the genset engine chassis 212, following by the installation of the mounting frame 230 including the genset module thereon, on the module chassis 222.

Figure 16:
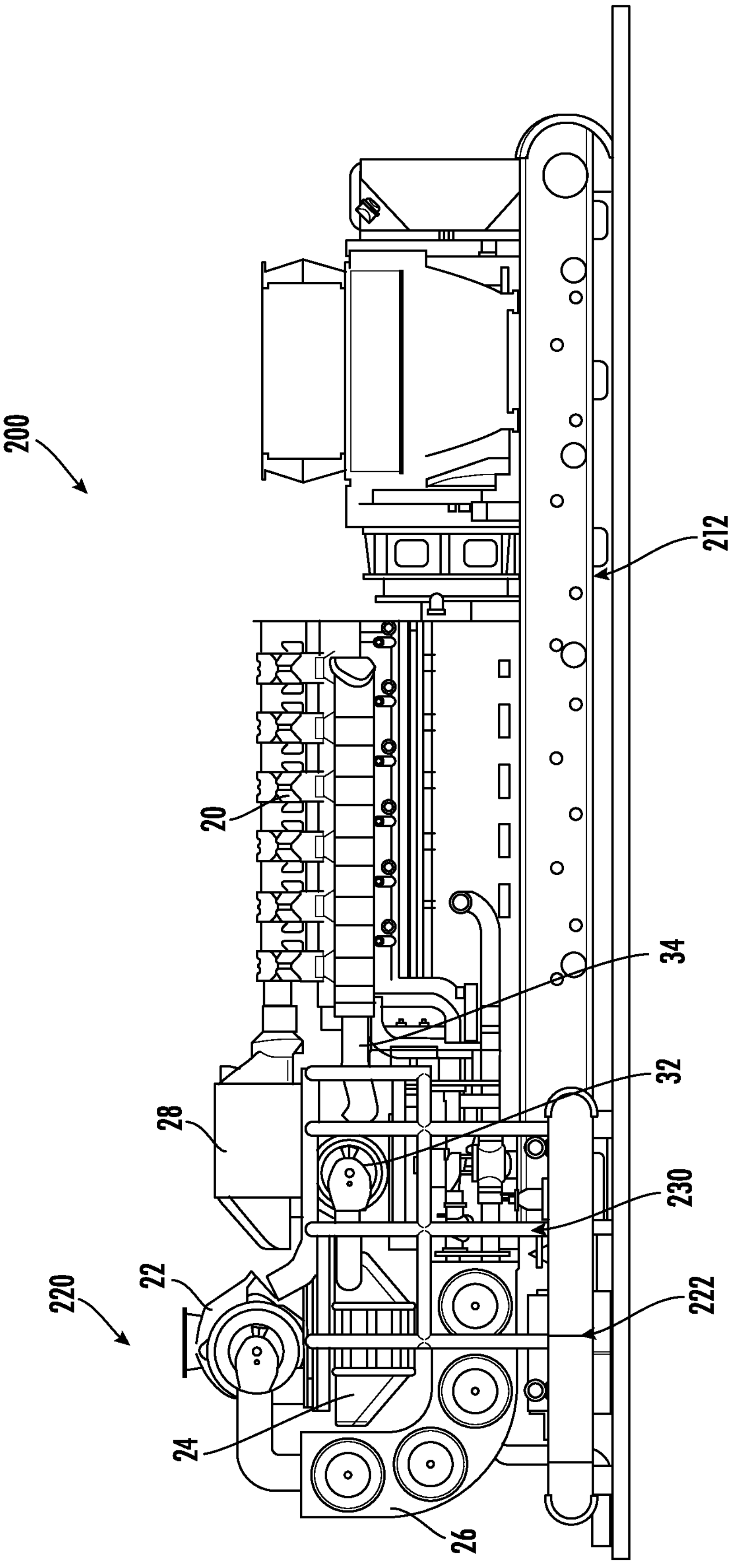
FIG. 16 is a side view of the module chassis and module frame of FIGS. 2, and 14-15 with an air handling module mounted thereon, and the module chassis coupled to a genset engine mounted on the genset engine chassis via the module chassis.
Figure 17:
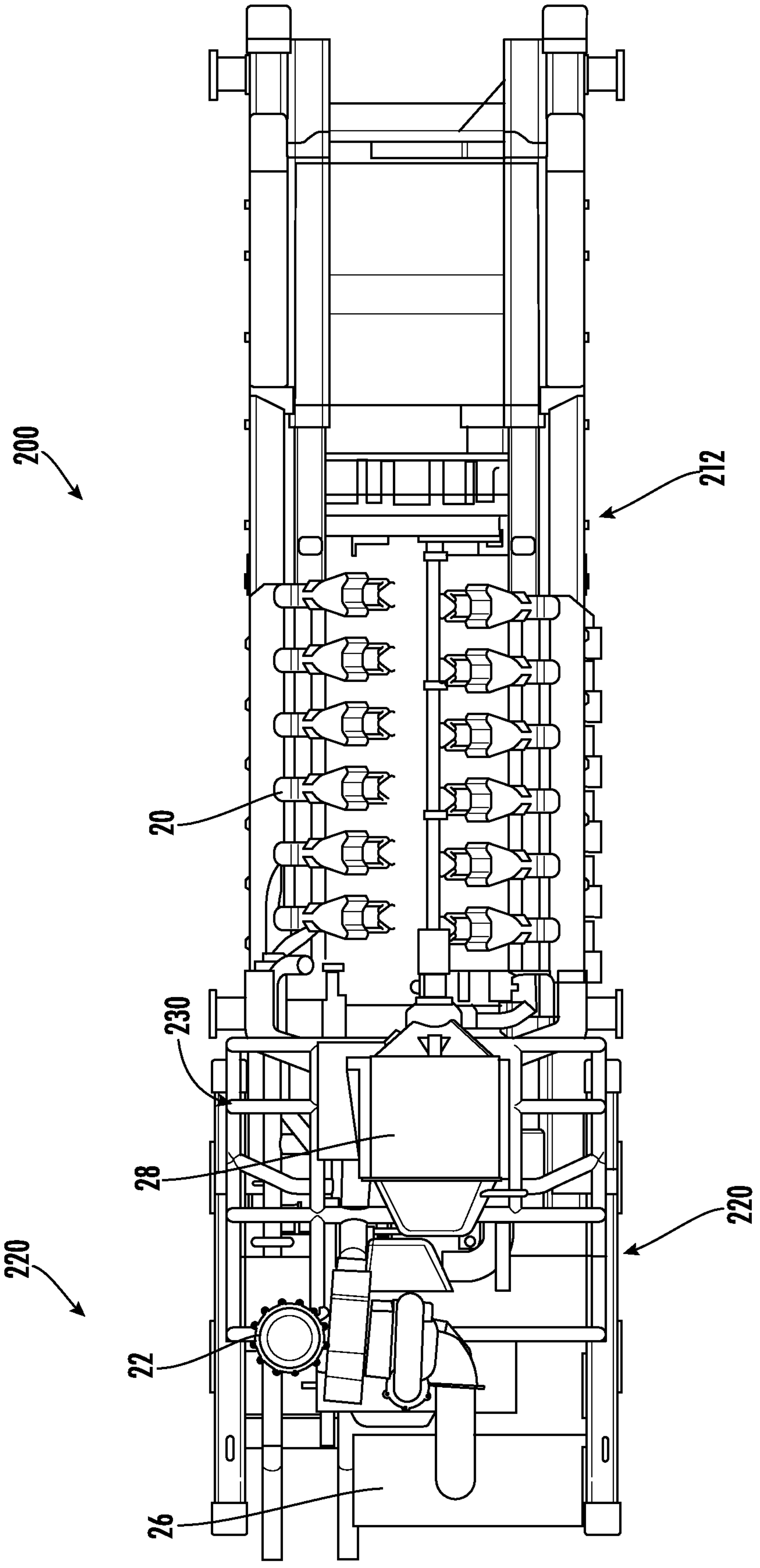
FIG. 17 is a top view of the module chassis and module frame of FIGS. 2 and 14-15 coupled to the genset engine chassis and the genset engine.

For example, FIG. 16 is a side view and FIG. 17 is a top view of an air handling module 220 mounted on the frame

230 which is installed on the module chassis 222. The air handling module 220 includes various components including a low pressure turbo 22, an intercooler 24, an air filter assembly 26, a charge air intercooler 28, a high pressure turbo 32, fluid conduits 34 and any other components for handling intake air communicated to a genset engine 20. The genset engine 20 is mounted on the genset engine chassis 212. The module chassis 222 is coupled to the genset engine chassis 212 as described before herein. The components of the air handling module 220 are mounted on the platforms 234 of the module frame 230 as described before herein. Once the air handling module 220 is positioned adjacent to the genset engine 20 and secured in place via the coupling of the module chassis 222 to the genset engine chassis 212, the conduits 34 of the air handling module 220 are coupled to the genset engine 20 thereby, operatively coupling the air handling module 220 to the genset engine 20.

Figure 18:
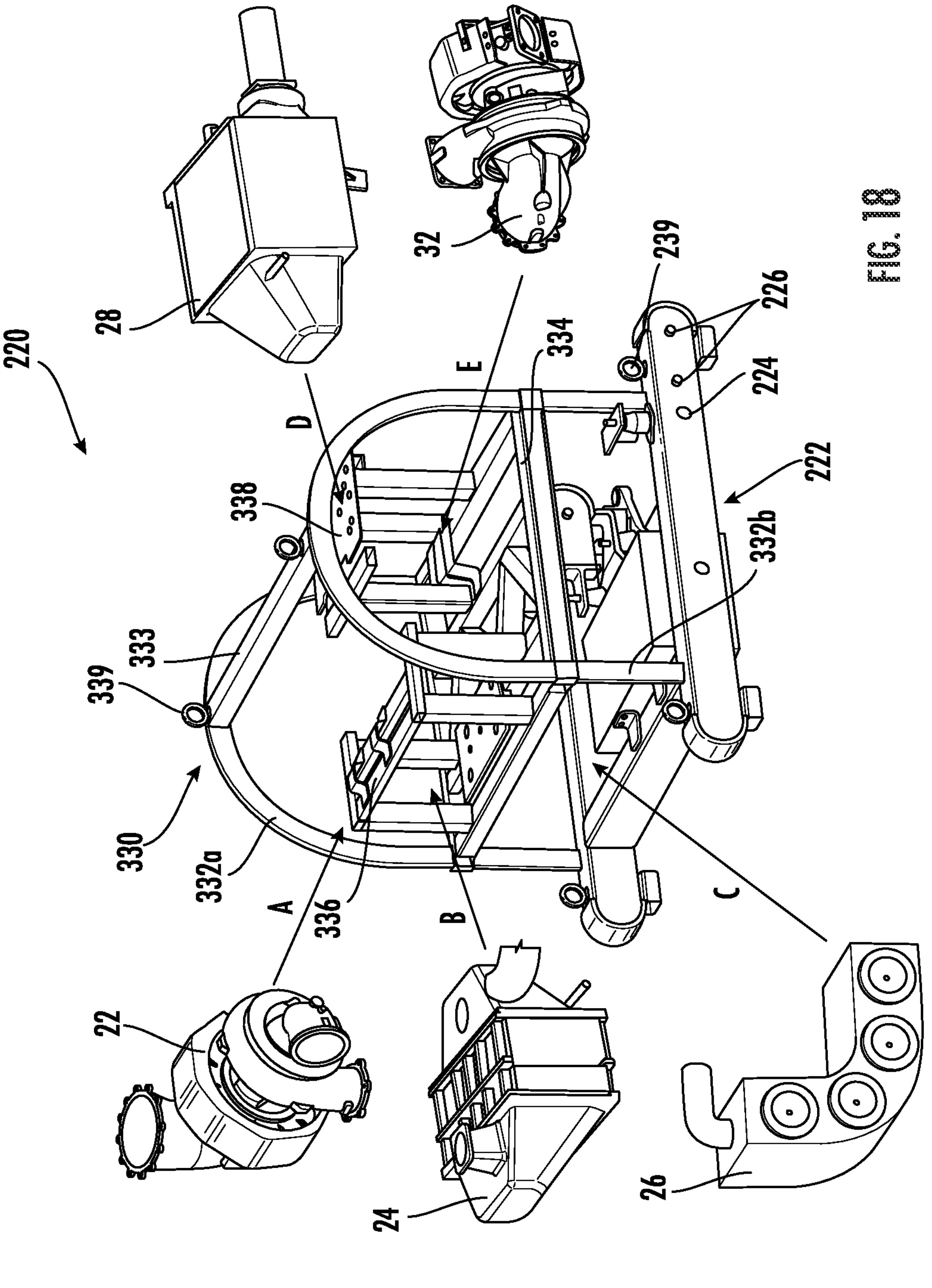
FIG. 18 is a perspective view of another embodiment of a module frame mounted on the module chassis of FIG. 2 and various components of an air handling module configured to be positioned at various locations within the module frame as shown by the arrows in FIG. 18.

FIG. 18 is a perspective view of another embodiment of a mounting frame 330 which can be used to mount components of the air handling module 220 or any other genset module on the mounting chassis 222. The module frame 230 includes a structure including a first U-shaped leg 332*a* and a second U-shaped leg 332*b* (collectively referred to herein as "the legs 332"). The ends of the first leg 332*a* are coupled to one arm of the pair of arms 224 of the module chassis 222. The ends of the second leg 332*b* are coupled to the second arm of the pair of arms 224 such that the first leg 332*a* and the second leg 332*b* are positioned opposite to each other and each leg resembles an "inverted U". A plurality of eye-bolts 339 are also provided on the first leg 332*a* and the second leg 332*b* to facilitate transportation of the mounting frame 330 and thereby, the air handling module 220 mounted therein.

A bar 333 is positioned between the legs 332 oriented orthogonal (e.g., positioned at an angel of 85 to 95 degrees, 80 to 100 degrees, 75 to 105 degrees, or 70 to 110 degrees inclusive of all ranges and values therebetween) to each of the leg 332, and coupled to each of the legs 332. A platform 334 is positioned orthogonally (e.g., positioned at an angel of 85 to 95 degrees, 80 to 100 degrees, 75 to 105 degrees, or 70 to 110 degrees inclusive of all ranges and values therebetween) between the legs 332 and configured to mount at least one component of the air handling module 220 or any other genset module. A first rack 336 and a second rack 338 are positioned on the platform 334 and additionally configured to mount at least one component of the air handling module 220.

For example, as shown in FIG. 18, the low pressure turbo 22 of the air handling module 220 is positioned on top of the first rack 336 as indicated by the arrow A and secured thereto. The intercooler 24 is positioned between the first rack 336 and the platform 334 as indicated by the arrow B. At least a portion of the air filter assembly 26 is positioned beneath the platform 334 in the space between the platform 334 and the module chassis 222 as indicated by the arrow C. The air aftercooler 28 is positioned on the second rack 338 and secured thereto as indicated by the arrow D, and the high pressure turbo 32 is positioned between the second rack 338 and the platform 334 as indicated by the arrow E.

Figure 19:
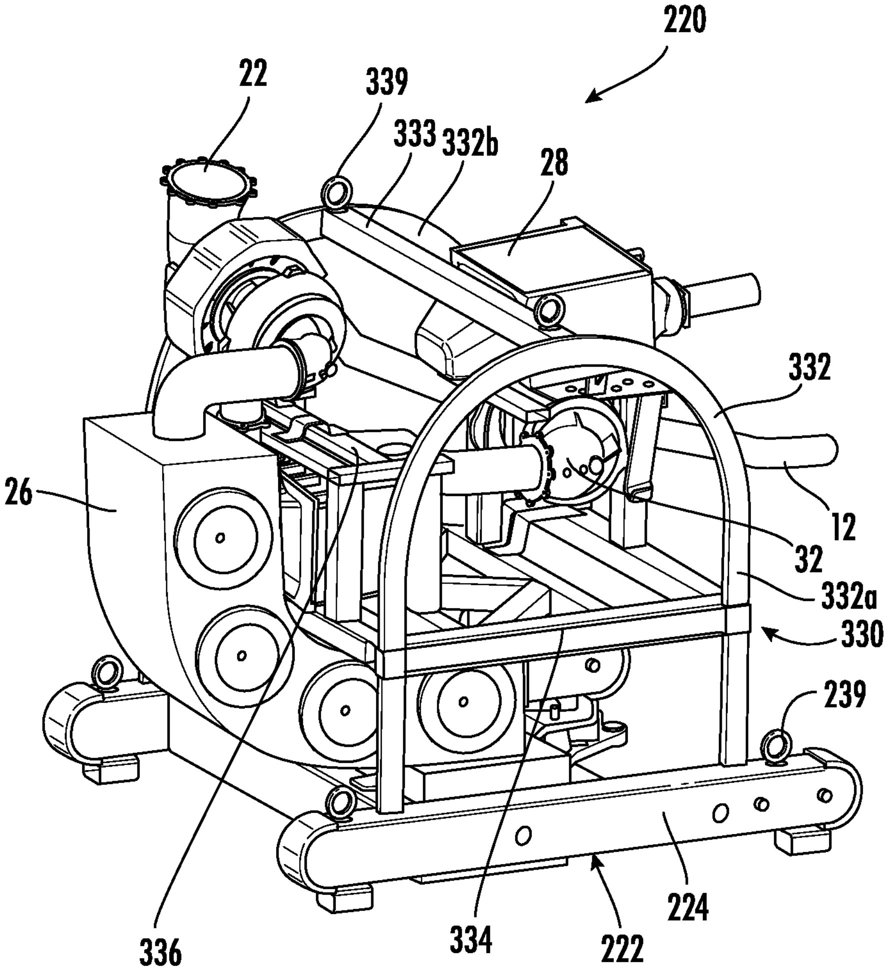
FIG. 19 is a perspective view of the module frame of FIG. 18 with the air handling module components mounted thereon and operatively coupled to each other.
Figure 20:
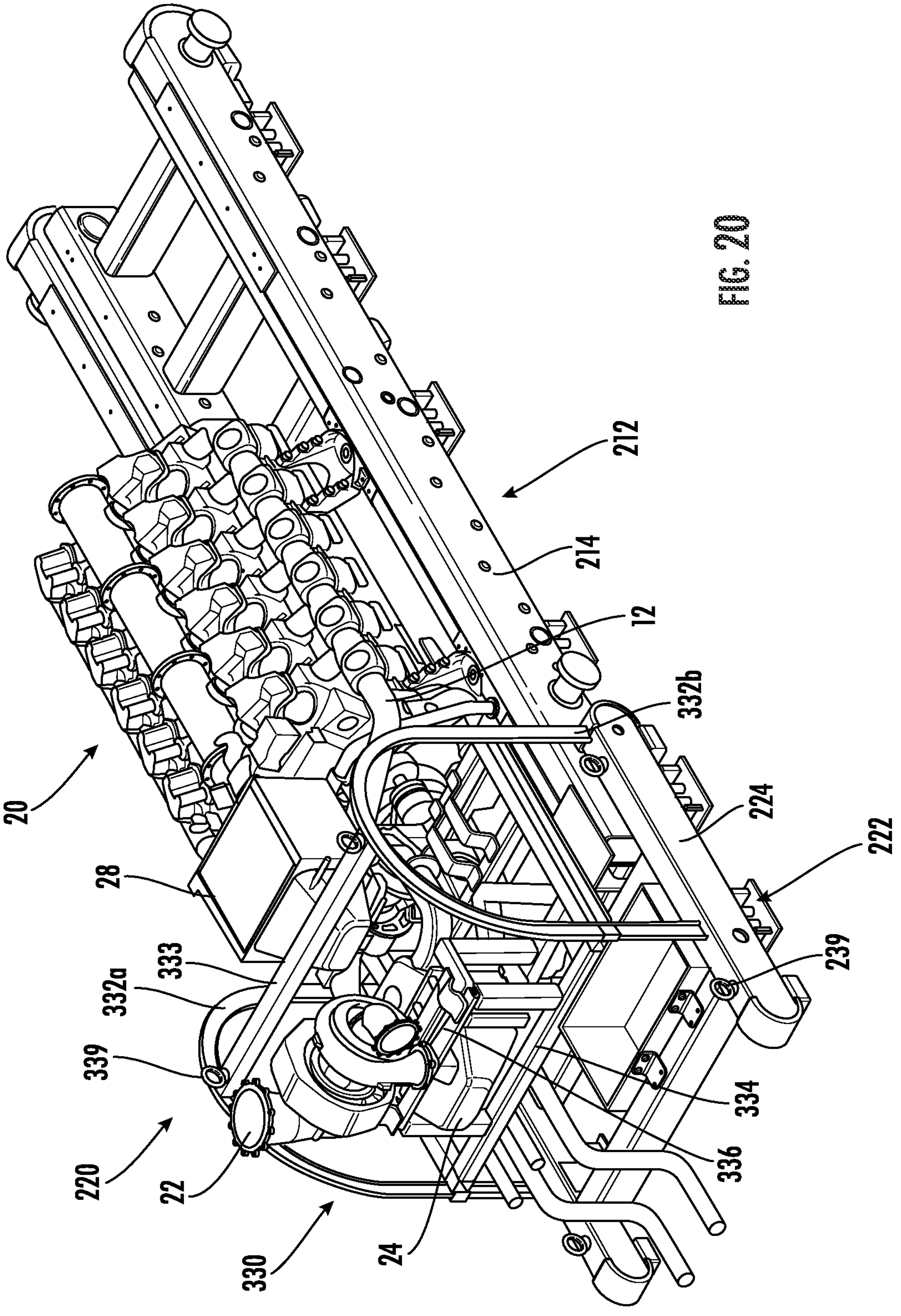
FIG. 20 is a perspective view of the air handling module of FIG. 19 coupled to a genset engine via the module chassis of FIG. 2.

FIG. 19 is a perspective view of the each component of the air handling module 220 mounted on the mounting frame 330 and operatively coupled to each other. The mounting frame 330 is mounted on the module chassis 222. FIG. 20 is a perspective view of the air handling module 220 coupled to the engine 20 mounted on the genset engine chassis 212 via the module chassis 222 as described before herein. A conduit 12 fluidly couples the air handling module 220 to the engine to communicate air to the engine 220.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A genset module coupling assembly comprising:

a cross-bar of a module chassis oriented orthogonal to an engine neutral axis of vibration defined by an engine mounted on an engine chassis;

a first bracket coupled to the cross-bar on a first side of the engine neutral axis of vibration; and a second bracket coupled to the cross-bar on a second side of the engine neutral axis of vibration, the first bracket and the second bracket being positioned to minimize communication of vibrations from the engine chassis to the module chassis.

2. The genset module coupling assembly of claim 1, wherein the first bracket defines a triangular shape with an edge of the first bracket coupled to the cross-bar and a point of the first bracket coupled to the engine chassis, and wherein the second bracket defines a triangular shape with an edge of the second bracket coupled to the cross-bar and a point of the second bracket coupled to the engine chassis.

3. The genset module coupling assembly of claim 1, wherein the first bracket is coupled to the cross-bar with one of a pivot mount, a swivel mount, or a ball-joint mount, and wherein the second bracket is coupled to the cross-bar with one of a pivot mount, a swivel mount, or a ball-joint mount.

4. The genset module coupling assembly of claim 1, wherein the first bracket includes a first aperture and a first pin is engagable through the first aperture with the engine chassis, and wherein the second bracket includes a second aperture and a second pin is engagable through the second aperture with the engine chassis.

5. The genset module coupling assembly of claim 1, wherein the module chassis defines a module neutral axis of vibration, and wherein the module neutral axis of vibration is aligned with the engine neutral axis of vibration.

6. The genset module coupling assembly of claim 1, wherein the first bracket and the second bracket are rotatably displaceable relative to the cross-bar while limiting angular motion within a plane of the module chassis and the engine chassis.

7. The genset module coupling assembly of claim 1, wherein the vibration of the engine chassis is absorbed by rotational motion of the first bracket and the second bracket to limit the amount of vibration transmitted to the module chassis.

* * * * *